US009299264B2

(12) United States Patent
Cecil et al.

(10) Patent No.: US 9,299,264 B2
(45) Date of Patent: Mar. 29, 2016

(54) SOUND ASSESSMENT AND REMEDIATION

(71) Applicant: Pearson Education, Inc., Upper Saddle River, NJ (US)

(72) Inventors: Cole Joseph Cecil, Coralville, IA (US); Bryce Winton Rodgers, Iowa City, IA (US); Vishal Kapoor, Iowa City, IA (US); Piyush Dubey, Iowa City, IA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 29 days.

(21) Appl. No.: 14/220,806

(22) Filed: Mar. 20, 2014

(65) Prior Publication Data

US 2015/0269852 A1    Sep. 24, 2015

(51) Int. Cl.
 *G04B 13/00* (2006.01)
 *A63H 5/00* (2006.01)
 *G09B 5/06* (2006.01)
 *G09B 15/02* (2006.01)

(52) U.S. Cl.
 CPC ............... *G09B 5/06* (2013.01); *G09B 15/023* (2013.01)

(58) Field of Classification Search
 CPC ............ G09B 15/00; G09B 7/02; G09B 5/06; G09B 5/04; G09B 5/065; G09B 5/02; G09B 17/00; G09B 17/04; G10H 2210/091; G10H 2220/015; G10H 2210/151; G10H 2210/031; G10H 2220/155; G10G 1/00; G10G 3/04; G10G 3/00; G10C 3/12; G10C 1/04; G10C 3/16
 See application file for complete search history.

(56) References Cited

U.S. PATENT DOCUMENTS

| | | | |
|---|---|---|---|
| 5,585,583 A * | 12/1996 | Owen | 84/470 R |
| 8,907,195 B1 * | 12/2014 | Erol | 84/609 |
| 2006/0032362 A1 * | 2/2006 | Reynolds et al. | 84/601 |
| 2007/0256543 A1 * | 11/2007 | Evans et al. | 84/609 |
| 2009/0038467 A1 * | 2/2009 | Brennan | 84/609 |
| 2010/0095828 A1 * | 4/2010 | Adams | 84/470 R |
| 2011/0003638 A1 * | 1/2011 | Lee et al. | 463/35 |
| 2011/0247479 A1 * | 10/2011 | Helms et al. | 84/613 |
| 2011/0259176 A1 * | 10/2011 | Pillhofer et al. | 84/470 R |
| 2012/0266738 A1 * | 10/2012 | Evans et al. | 84/609 |
| 2013/0302763 A1 * | 11/2013 | Edwards et al. | 434/159 |
| 2014/0033899 A1 * | 2/2014 | Dripps et al. | 84/483.1 |

OTHER PUBLICATIONS

"Interactive Music Learning Software." *SmartMusic—Music Education Software*.SmartMusic, 2014. Retrieved from <http://www.smartmusic.com> on Apr. 15, 2014, 1 page.
"SmartMusic on iPAD." *SmartMusic on iPad—Now Available*. SmartMusic, 2014. Retrieved from <http://www.smartmusic.com/mobile/> on Apr. 15, 2014, 2 pages.

* cited by examiner

*Primary Examiner* — Marlon Fletcher
(74) *Attorney, Agent, or Firm* — Kilpatrick Townsend & Stockton LLP

(57) ABSTRACT

Generally, embodiments of the disclosure are directed to methods, computer readable medium, servers, and systems for providing sound assessment and remediation between a computing device and a user instrument. The sound assessment may be based on algorithmic composition or a threshold to remediate performance of providing a plurality of sounds.

20 Claims, 12 Drawing Sheets

SOUND ASSESSMENT AND REMEDIATION

BACKGROUND

Some students find it difficult to read notes in sheet music. For example, the student practices playing particular sounds on a musical instrument, but may not be able to tell whether they provide a correct sound in comparison with a note on the sheet music. Some students simply play a sound based on a remembered melody or composed series of notes, but not necessarily based on reading the note. Music teachers can inform the student when they provide an incorrect sound, but the teachers' knowledge is based on years of training and practice. The student is somewhat abandoned if the teacher is unavailable and the student wants to practice reading sheet music. Also, the student needs to find different music to practice or the student will play the notes from memory instead of reading the note.

SUMMARY

In one embodiment, the present disclosure provides a computing device for providing sound assessment and remediation for a plurality of sounds caused by a user. The computing device includes a processor configured to identify a plurality of notes for a user, a graphical user interface for to provide one or more notes on a screen of the computing device, and a microphone for receiving a plurality of sounds caused by the user. The computing device can provide one or more notes for a user less often than the other notes based in part on the user providing the correct sounds in association with the notes.

In another embodiment, the present disclosure provides a computer readable medium storing computer-executable instructions that, when executed by a processor, cause the processor to perform operations for providing sound assessment and remediation for a plurality of sounds caused by a user. The operations can comprise identifying a first plurality of notes for the user, displaying the first plurality of notes on a screen of a computing device, receiving the plurality of sounds caused by the user, analyzing the plurality of sounds, identifying a second plurality of notes for the user, and displaying the second plurality of notes on the screen of the computing device. The second plurality of notes may be visual representations of the first note and the second note displayed on the screen of the computing device. The first note in the second plurality of notes may be played less often than the second note in the second plurality of notes based in part on the user providing the correct first sound and the incorrect second sound in association with the first plurality of notes.

In yet another embodiment, the present disclosure provides a computer-implemented method of providing sound assessment and remediation for a plurality of sounds caused by a user. The method can identify a first plurality of notes for the user, the first plurality of notes including a first note and a second note. The method can display the first plurality of notes on a screen of a computing device. The first plurality of notes may be visual representations of the first note and the second note displayed on the screen of the computing device. The method can receive the plurality of sounds caused by the user, including a first sound and a second sound. The method can analyze the plurality of sounds, including determining that the first sound corresponds with the first note, the first sound that corresponds with the first note is correct, the second sound corresponds with the second note, and the second sound that corresponds with the second note is incorrect. The method can identify a second plurality of notes for the user, the second plurality of notes including the first note and the second note. The method can display the second plurality of notes on the screen of the computing device, where the second plurality of notes are visual representations of the first note and the second note displayed on the screen of the computing device. The first note in the second plurality of notes may be played less often than the second note in the second plurality of notes based in part on the user providing the correct first sound and the incorrect second sound in association with the first plurality of notes.

Figure 1:
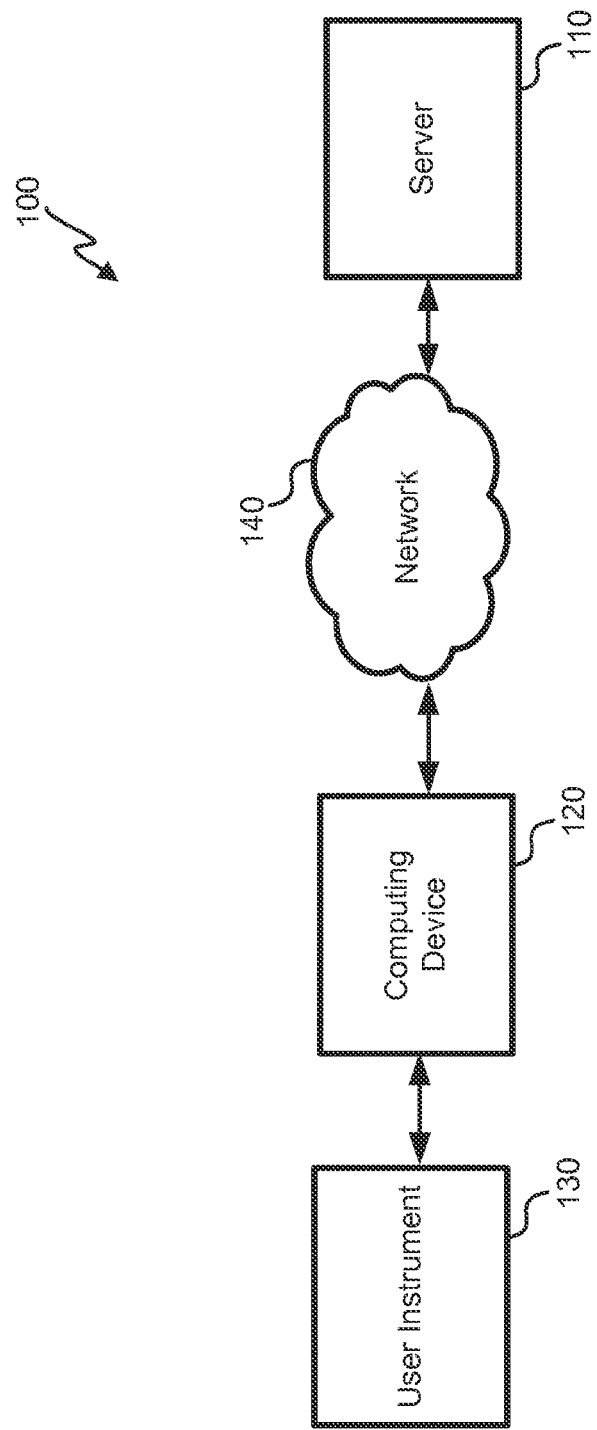
FIG. 1 illustrates an example architecture for providing an assessment and remediation of sounds described herein that includes a server, computing device, and an instrument, according to at least one example.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a computing device for providing sound assessment and remediation for a plurality of sounds caused by a user. This computing device includes, for example, a processor. The processor is configured to identify a first plurality of notes for the user, the first plurality of notes including a first note and a second note, and a second plurality of notes for the user, the second plurality of notes including the first note and the second note.

The computing device also includes a graphical user interface displayed by a screen associated with the computing device. The graphical user interface is configured to provide the first note to the user. The first note is a visual representation of the first note displayed on the screen of the computing device and the first note is included in the first plurality of notes for the user.

The computing device also includes a microphone. The microphone is configured to receive the plurality of sounds caused by the user. The plurality of sounds includes a first sound and a second sound. The microphone receives the first sound corresponding to the first note included in the first plurality of notes for the user.

The processor determines that the first sound corresponds with the first note and that the first sound that corresponds with the first note is correct. The graphical user interface provides the second note to the user. The second note is a visual representation of the second note displayed on the screen of the computing device and the second note is included in the first plurality of notes for the user.

The microphone receives the second sound and the processor determines that the second sound corresponds with the second note in the first plurality of notes for the user. The processor determines that the second sound that corresponds with the second note is incorrect. The graphical user interface is configured to display the second plurality of notes for the user. The first note in the second plurality of notes is played less often than the second note in the second plurality of notes based in part on the user providing the correct first sound and the incorrect second sound in association with the first plurality of notes.

In one embodiment, the present disclosure provides a computer-readable storage medium storing computer-executable instructions that, when executed by a processor, cause the processor to perform operations for providing sound assessment and remediation for a plurality of sounds caused by a user. The operations comprise identifying a first plurality of notes for the user, the first plurality of notes including a first note and a second note and displaying the first plurality of notes on a screen of a computing device. The first plurality of notes is visual representations of the first note and the second note displayed on the screen of the computing device. The operations also comprise receiving the plurality of sounds caused by the user, the plurality of sounds including a first sound and a second sound.

The operations also comprise analyzing the plurality of sounds. The analysis includes determining that the first sound corresponds with the first note, the first sound that corresponds with the first note is correct, the second sound corresponds with the second note, and the second sound that corresponds with the second note is incorrect. The operations also comprise identifying a second plurality of notes for the user, the second plurality of notes including the first note and the second note. The operations also comprise displaying the second plurality of notes on the screen of the computing device. The second plurality of notes is visual representations of the first note and the second note displayed on the screen of the computing device. The first note in the second plurality of notes is played less often than the second note in the second plurality of notes based in part on the user providing the correct first sound and the incorrect second sound in association with the first plurality of notes.

In one embodiment, the present disclosure provides a computer-implemented method of providing sound assessment and remediation for a plurality of sounds caused by a user. The method comprises identifying a first plurality of notes for the user, the first plurality of notes including a first note and a second note. The method also includes displaying the first plurality of notes on a screen of a computing device. The first plurality of notes is a visual representation of the first note and the second note displayed on the screen of the computing device. The method also includes receiving the plurality of sounds caused by the user. The plurality of sounds includes a first sound and a second sound.

The method also includes analyzing the plurality of sounds. The analysis includes determining that the first sound corresponds with the first note, the first sound that corresponds with the first note is correct, the second sound corresponds with the second note, and the second sound that corresponds with the second note is incorrect. The method also includes identifying a second plurality of notes for the user. The second plurality of notes includes the first note and the second note. The method also includes displaying the second plurality of notes on the screen of the computing device. The second plurality of notes is a visual representation of the first note and the second note displayed on the screen of the computing device. The first note in the second plurality of notes is played less often than the second note in the second plurality of notes based in part on the user providing the correct first sound and the incorrect second sound in association with the first plurality of notes.

With reference now to FIG. 1, a block diagram of one embodiment of a system for providing sound assessment and remediation is shown. The system 100 includes example architecture, including server 110, computing device 120, user instrument 130, and network 140.

The system 100 includes a server 110. The server 110 is configured to identify a visual representation of a note for display, identify a correct sound corresponding with the note, identify a remediation process based on a remediation score range, and/or determine a process for algorithmic composition. It should be appreciated that one or more of these configurations may also be implemented in computing device 120. Details and features of one type of server 110 are provided in association with FIG. 2.

The system 100 includes a computing device 120. The computing device 120 is configured to identify a plurality of notes, display notes on a screen of the computing device 120, receive a plurality of sounds caused by a user, analyze the sounds, and provide feedback for sound assessment and remediation. In some embodiments, the computing device 120 will identify a plurality of notes based on algorithmic composition or based on which sounds that correspond with notes are correct or incorrect from a user. Details and features of some types of computing device 120 are provided in association with FIGS. 3-4.

The system 100 includes a user instrument 130. The user instrument 130 is configured to provide a plurality of sounds. For example, the user instrument includes a user's voice, body movements (e.g., clapping), string or electronic instruments (e.g., plucking strings to make sounds), or instruments based on various musical ranges (e.g., soprano, alto, tenor, baritone, or bass). The user instrument 130 may be constructed with various materials, colors, or shapes. One or more entities may be used to generate the plurality of sounds as well.

The system 100 also includes a network 140. The network 140 includes wired or wireless connections to one or more intranets (e.g., located within the geographic area of the server 110, computing device 120, and user instrument 130), one or more internets (e.g., located within and outside of the geographic area of the server 110, computing device 120, and user instrument 130), public or private channels, communication tunnels between one or more servers, or other means of communication. The network 140 may include encryption or other forms of protection to help secure the notes, algorithmic composition process, user data, sound history data, credentials, and other information that is transmitted and received between the server 110, computing device 120, or user instrument 130. One or more devices may communicate, transmit, or receive information through the network 140, including the server 110, computing device 120, or user instrument 130.

Figure 2:
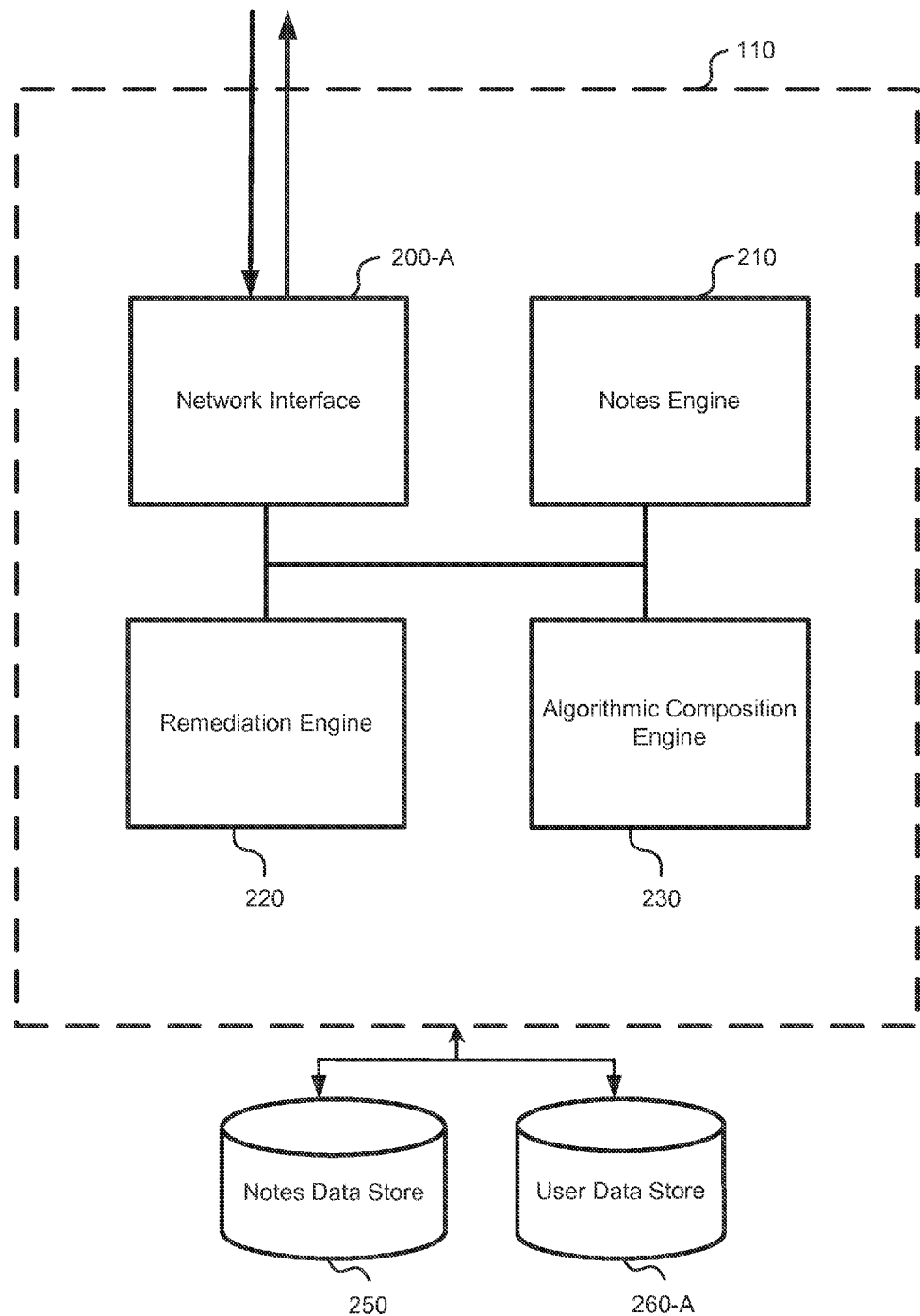
FIG. 2 illustrates an example architecture of a server with one or more data stores, according to at least one example.

With reference now to FIG. 2, a block diagram of one embodiment of a server 110 for providing sound assessment and remediation for a user is shown. For example, the server 110 includes a network interface 200, notes engine 210, remediation engine 220, algorithmic composition engine 230, and one or more data stores, including a notes data store 250 and user data store 260-A. It should be appreciated that one or more of these aspects can also or alternatively be implemented with the computing device 120.

As depicted in FIG. 2, the server 110 includes a network interface 200-A (hereinafter identified as network interface 200). The network interface 200 allows the devices, networks, and other systems to access the other components of the system 100. The network interface 200 includes features configured to send and receive information, including, for example, a network antenna, a modem, a transmitter, receiver, network adapter or any other feature that can send and receive information. The network interface 200 can communicate via telephone, cable, fiber-optic, and other wired communication network, including network 140. In some embodiments, the network interface 200 communicates via cellular networks, WLAN (wireless local area networking) networks, or any other wireless network.

The network interface 200 can also be configured to send and receive data. In some embodiments, the network interface 200 sends a plurality of notes to a computing device 120, sends a process for identifying a plurality of notes for a user, and receives user data from the computing device 120 (e.g., which notes or sounds are correct from a user, which remediation score or level corresponds with the user, etc.).

The server 110 also includes a notes engine 210. The notes engine 210 is configured to identify a visual representation of a note for a display. For example, the note "G4" correlates with a particular visual representation that is different than an "F4" note (e.g., in terms of location on a staff). The visual representations of these notes are known in the art and an example of a G4 note is provided with FIG. 5. The visual representation of the note can be provided to the computing device to display by a screen associated with the computing device.

The notes engine 210 is also configured to identify a sound that corresponds with the note. For example, the G4 note has a particular sound that has a lower frequency than an F4 note.

The notes engine 210 can correlate the appropriate sound with the note. This can help the computing device 120 correlate the received sound caused by the user with and appropriate sound for the note (e.g., by comparing the appropriate sound with the received sound and determining if the received sound is incorrect based on a threshold difference between the two sounds). In some embodiments, the received sound is analyzed and the notes engine 210 determines which note was received based on the properties of the sound. The note may be compared with the appropriate (e.g., expected) note to determine if the received note and expected note are substantially the same.

The server 110 also includes a remediation engine 220. The remediation engine 220 is configured to define a remediation level based on a remediation score (e.g., scores between 25-50% receive high remediation). The remediation level can identify the number of notes to display for the user in the plurality of notes (e.g., one or three notes at a particular time, five notes flashed for a predetermined amount of time over a series of displays, sequentially, etc.), the range of notes displayed for the user (e.g., displaying the eight notes in an octave), the speed at which the notes are displayed (e.g., all notes at one time, flashing a note or plurality of notes for a few seconds, etc.), or any other changeable metric in displaying a plurality of notes to a user through the computing device 120.

The remediation level can determine whether a user advances to a higher difficulty level (e.g., scores between 90-100% are associated with low remediation and advance to a more difficult plurality of notes). For example, a skilled user may need less remediation in order to improve (e.g., the user already knows how to sight-read all of the notes). In another example, a user may receive more remediation in order to improve the speed at which the user is able to recognize the notes, even though the user is able to recognize and play the correct sounds that correspond with the notes.

The remediation engine 220 is also configured to provide the range of remediation scores to the computing device. For example, the remediation engine 220 or network interface 200 transmits the range(s) of remediation scores to the computing device 120. The computing device 120 can compare a user's remediation score with a threshold (e.g., the edges of the range of remediation defined by the remediation engine 220). When the remediation score is below the threshold, the computing device 120 can identify a plurality of notes for the user based on the identified threshold by the remediation engine 220. When the remediation score is at or above the threshold in comparison with the range of remediation scores, the user can remain at a particular remediation level.

The server 110 also includes an algorithmic composition engine 230. The algorithmic composition engine 230 is configured to identify one or more notes in a plurality of notes based on algorithmic composition. Algorithmic composition may include selecting one or more notes in a plurality of notes without human intervention, including the use of existing songs generated by humans (e.g., composers) or computers.

The algorithmic composition engine 230 is also configured to determine a process for identifying notes. For example, the algorithmic composition engine 230 selects a first note, and then selects a second note based on chance. In another example, the algorithmic composition engine 230 selects a first note, and then selects a second note based on a set of customary notes that follow the first note (e.g., from existing songs). The algorithmic composition engine 230 can select the second note because the second note less frequently follows the first note in the existing songs or is a randomized second note. In yet another example, the process may start with several defined series of notes (e.g., set one includes "E, B, F," set two includes "G, B, E," etc.) and allow the computing device 120 to pick which one of the predefined sets of notes to provide to the user. In still another example, the algorithmic composition engine 230 identifies a plurality of possible notes and the computing device 120 randomly selects the plurality of notes to display for the user from the plurality of possible notes.

The server 110 also interacts with one or more data stores, including a notes data store 250 and user data store 260-A (hereinafter user data store 260). The data stores are associated with a distributed or local data system accessible by the server 110. For example, the engines or modules provided by the server 110 (e.g., notes engine 210, remediation engine 220, or algorithmic composition engine 230) provide requests for information that may be stored in one or more of the data stores.

The notes data store 250 receives one or more notes from a plurality of sources. For example, the notes include musical notes, bars, scores, letters, number, symbols, visual representations of the notes, or other information corresponding with the note. In some examples, the notes data store 250 also stores appropriate sounds that correspond with the notes (e.g., in audio files, visual representations of sounds that appear to be waves, etc.) and/or properties of the sounds or notes (e.g., to compare with the received sounds from a user).

When algorithmic composition is used, the notes data store 250 can store notes or a plurality of notes that are used with the algorithmic composition. The notes (e.g., A, B, C, D, E, F, or G) or a plurality of notes (e.g., A, G, F) may be accessed or analyzed by the algorithmic composition engine 230 to identify the frequency at which the notes are displayed (e.g., how often or infrequently the notes are displayed). The notes may also be accessed randomly and/or transmitted to the computing device 120 to display for the user.

The user data store 260 is configured to store information related to the user. For example, a user is identified by a user name, sound (e.g., from a user instrument), identifier (e.g., login or profile identifier, computing device identifier, etc.), or a session identifier (e.g., by associating a session with a user while they are using a particular network browser/application). The user can also be identified by a remediation score or an identification of the sounds caused by the user that were correct or incorrect when compared with the corresponding notes.

Figure 3:
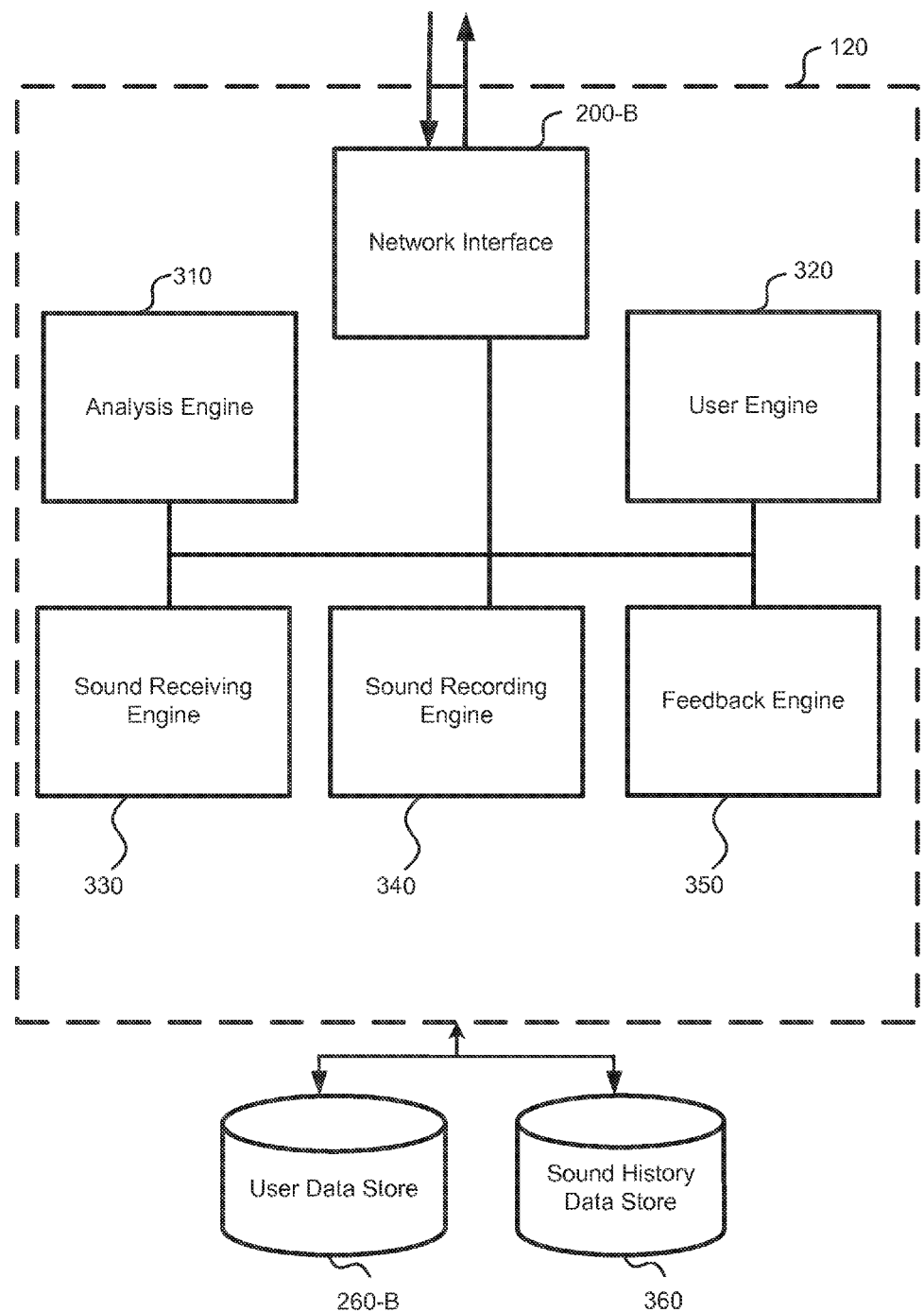
FIG. 3 illustrates an example architecture of a computing device with one or more data stores, according to at least one example.

With reference now to FIG. 3, a block diagram of one embodiment of a computing device for providing sound assessment and remediation for a user is shown. For example, the computing device 120 includes a network interface 200-B (hereinafter network interface 200), analysis engine 310, user engine 320, sound receiving engine 330, sound recording engine 340, feedback engine 350, and one or more data stores, including a user data store 260-B (hereinafter user data store 260) and sound history data store 360. It should be appreciated that one or more of these aspects can also or alternatively be implemented in the server 110.

In some embodiments, the computing device 120 also or alternatively implements one or more aspects of the server 110. For example, the computing device 120 identifies the visual representation of the note for display on a graphical user interface, identifies a correct sound corresponding to a note, identifies a remediation process based on a remediation score range, determines a process for algorithmic composition, or implements one or more engines defined with the server 110, including a notes engine 210, remediation engine 220, or algorithmic composition engine 230.

The computing device 120 also includes an analysis engine 310. The analysis engine 310 is configured to identify a plurality of notes, including a first note and a second note. The plurality of notes can include one or more types of notes (e.g., E, F, G, A, B, C, D, whole notes, half notes, quarter notes, etc.). The analysis engine 310 may identify a plurality of notes (e.g., a first plurality of notes) based on several factors, including confirming each note is played twice in the plurality of notes, confirming the user provides a sound corresponding with each note at least once, etc. The analysis engine 310 may identify a plurality of notes (e.g., a second plurality of notes) based on other factors as well, including the performance of the user with respect to particular notes, correct or incorrect sounds caused by the user in response to a previously-displayed plurality of notes, or feedback provided to the user.

In some examples, the analysis engine 310 identifies a percentage of notes that were correct and a percentage of notes that were incorrect from a previous plurality of notes (e.g., 70% of the notes that were incorrect and 30% of the notes that were correct from the first plurality of notes) in order to identify a second plurality of notes (e.g., sound assessment). The identification of correct notes in the second plurality of notes can help the user practice the notes (e.g., sound remediation), confirm that the user purposefully provided the appropriate sound corresponding with the note in the first plurality of notes, provide a more complete picture of the notes available for practice, or other reasons.

The analysis engine 310 is also configured to provide a first note via a graphical user interface. For example, the analysis engine 310 can display the note with a clef (e.g., defining a pitch range) and/or rests (e.g., breath marks, Caesura, etc.) with the plurality of notes. The clef, notes, and rests can be placed on a staff (e.g., the lines that the plurality of notes are placed on in order to identify the type of note and/or pitch of a diatonic scale). Other information may be provided as well (e.g., accidentals that modify the pitch of the notes, time signatures that define the meter of the music, etc.).

The analysis engine 310 is also configured to associate a sound with a note. For example, the analysis engine 310 identifies that note G4 is associated with a frequency of 391.995 Hz and note F4 is associated with frequency 349.228 Hz. In another example, the analysis engine 310 identifies the sound wave associated with the sound and compares the sound wave with other known sounds waves for the notes to determine which sound wave was received from the user. Other methods of associating sounds with notes that are known in the industry can be implemented without diverting from the essence of the disclosure.

The analysis engine 310 is also configured to determine if a sound is correct or incorrect when compared with a note (e.g., sound assessment). For example, once the analysis engine 310 identifies the received sound (e.g., using the measured frequency of the sound, using the sound wave of the received sound, etc.) with the note displayed by the graphical user interface, the analysis engine 310 determines if the sound is correct or incorrect. This may include comparing the note corresponding with the received sound (e.g., note G4) with the note displayed by a graphical user interface (GUI) (e.g., note F4). When the two sources of notes do not match, the analysis engine 310 can determine that the user caused an incorrect sound for the particular note. When the two sources match (or match within a threshold), the analysis engine 310 can determine that the user caused a correct sound for the particular note.

The analysis engine 310 is also configured to identify how often the notes in a subsequent plurality of notes are displayed based on whether the note is correct or incorrect. For example, the notes may be correct or incorrect in response to displaying a first plurality of notes on a screen of the computing device 120. The same notes can be included in a second plurality of notes that are displayed on the screen of the computing device 120. The note(s) that are identified as correct from the first plurality of notes can be played less often in the second plurality of notes.

The analysis engine 310 is also configured to identify one or more notes based on algorithmic composition. For example, the notes may be correct or incorrect in response to displaying a first plurality of notes on a screen of the computing device 120, receiving a plurality of sounds caused by the user, and analyzing the sounds with the notes to determine whether the sounds are correct or incorrect. The analysis engine 310 can identify the notes that should be played more frequently (e.g., by displaying the notes that were incorrect more often).

When algorithmic composition is used, the analysis engine 310 may identify the second plurality of notes starting with the incorrect first note and choosing a second note based on an algorithmic composition process (e.g., identified by the server 110, identified by the computing device 120, etc.). For example, the analysis engine 310 can select the second note based on chance (e.g., randomly selecting the second note from all possible notes) or some percentage of randomness (e.g., 70% random to ensure that the incorrect notes are displayed more frequently). In another example, the analysis engine 310 can select the second note based on identifying a set of customary notes that follow the first note (e.g., from existing songs). The analysis engine 310 can select the second note because the second note that less frequently follows the first note in the existing songs. In yet another example, the analysis engine 310 can select the second note from several defined series of notes (e.g., set one includes "E, B, F," set two includes "G, B, E," etc.) to provide to the user.

The analysis engine 310 is also configured to identify a type of user instrument based on a timbre. The timbre can be recognized in the plurality of sounds. For example, the user causes the user instrument to provide a plurality of sounds (e.g., by plucking strings, causing the air column inside the instrument to vibrate, singing, etc.) and the analysis engine 310 determines the type of user instrument that provided the plurality of sounds (e.g., voice, musical instrument, etc.) based on the characteristics of the sound.

The identification of the user instrument (e.g., by timbre, by a user's identification of the instrument, etc.) can affect the plurality of notes identified for the user. For example, a user may play a piano, violin, and double bass that have different ranges of notes. The violin, in some examples, is limited to a smaller range of notes than a piano. In this case, the computing device that displays the plurality of notes for the violin displays fewer notes than the computing device that displays the plurality of notes for a user operating a piano. The double bass is also limited to a smaller range of notes than a piano. Similarly, the computing device displays fewer notes for the user operating the double bass than the computing device that displays the plurality of notes for a user operating the piano.

The analysis engine 310 is also configured to identify a remediation score for the user (e.g., for sound assessment and remediation). A remediation score can be a grade (e.g., letter or number), percentage, or other identification of the recommended remediation level associated with a particular user and/or user instrument. The remediation score can identify the user's performance (e.g., over time, for a particular plurality of notes, etc.), which can be provided as feedback to the user with respect to the first sound corresponding with the first note or the second sound corresponding with the second note. The remediation score can be compared with a threshold and when the remediation score is below the threshold, a plurality of notes can be identified and provided to the user.

The computing device 120 also includes a user engine 320. The user engine 320 is configured to identify a user that provides a plurality of sounds for the computing device 120. The user may be identified by a user name, sound (e.g., from a user instrument), identifier (e.g., login or profile identifier, computing device identifier, etc.), or a session identifier (e.g., associate a session identifier with a user while they are using a particular network browser/application). The user can also be identified by the remediation score or an identification of the sounds caused by the user that were correct or incorrect when compared with the corresponding notes. In some embodiments, the user anonymously provides sounds to the computing device 120.

The identification of the user can help identify a performance of the user, which may be used to determine the difficulty level associated with identifying a plurality of notes. For example, when the user performs at a particularly high level with the first plurality of notes, the second plurality of notes for the same user can be more difficult, faster, more varied, etc. In another example, the computing device 120 identifies that the user did not provide a correct sound for the second note in the first plurality of notes. The user engine 320 can identify a second plurality of notes that includes the second note more often than the second note appeared in the first plurality of notes. The same repetitiveness of the second note may not be needed for a different user, because a different user might have provided the correct sound in response to the same second note.

The user engine 320 is also configured to update an identification of a user. For example, the user may start at a very low difficulty level and receive a simple plurality of notes (e.g., A, B, C, etc. in order). When the user provides appropriate sounds corresponding to the plurality of notes, the user engine 320 can identify the need for a higher difficulty level (e.g., D, E, A, in randomized order). The higher difficulty level may also include providing multiple notes at one time, varying the timing or tempo of the notes, and the like.

The computing device 120 also includes a sound receiving engine 330. The sound receiving engine 330 is configured to receive a plurality of sounds caused by a user, including a first and second sound. The plurality of sounds may correspond with a plurality of notes, including a first sound corresponding with a first note and a second sound corresponding with a second note.

The sound receiving engine 330 is also configured to wait a predetermined amount of time to receive a sound caused by a user. For example, the predetermined amount of time may include one second (e.g., three-tenths of one second or any other amount of time) in order to receive and recognize a distinct sound from the user. When a stream of sounds are received from the user, the sound receiving engine 330 can receive the stream of sounds and parse the stream to identify a plurality of sounds. For example, the stream is parsed once per second so that in a five-second stream of sounds, the sound receiving engine 330 identifies a plurality of sounds that includes five sounds. The five sounds can correspond with the five notes, and the computing device 120 can identify which notes that correspond with the sounds are correct or incorrect.

In another example, the predetermined amount of time may vary. For example, when the type of note is a full note, the predetermined amount of time is one second. When the type of note is a quarter note, the predetermined amount of time is a quarter of a second. Various alterations to the predetermined amount of time are also available (e.g., three-tenths of a second for a quarter note). The sound receiving engine 330 can include a buffer (e.g., the amount of time when no sound should be received or recorded). The buffer can be added to the predetermined amount of time or the buffer can be used to allow the user to rest between the notes.

In another example, the sound receiving engine 330 receives a plurality of sounds from the user and identifies one or more changes in the plurality of sounds. The changes in the plurality of sounds and/or stream of sounds can be used to identify a first sound and second sound caused by the user. For example, a pitch of the plurality of sounds may start at a particular frequency that the computing device 120 identifies as the first note. The pitch may change (e.g., to a different frequency). The computing device 120 can identify the changed pitch associated with the sound as the second sound. Once the first sound and second sound are identified, the sound receiving engine 330 can analyze the identified plurality of sounds in relation to the plurality of notes. For example, the first sound in the plurality of sounds can correspond with the first note and the second sound in the plurality of sounds may correspond with the second note.

The sound receiving engine 330 can be implemented by a microphone. For example, the microphone collects sounds. The microphone can include a sensor that converts sound in the air into an electrical signal. The electrical signal (or sound) may be recorded by the computing device 120 (e.g., with the sound recording engine 340) and/or stored (e.g., with the sound history data store 360).

The computing device 120 also includes a sound recording engine 340. The sound recording engine 340 is configured to store information to the plurality of sounds and/or notes. For example, the plurality of sounds caused by the user is stored with the computing device 120 (e.g., in order to analyze at a later time, in order to access and provide back to the user as part of the feedback, in order to analyze a user's performance over time, etc.).

In another example, the sound recording engine 340 can store the determination identified by the computing device (e.g., processor) with the sound history data store 360. The stored determination can include the determination that the first sound that corresponds with the first note is correct and the second sound that corresponds with the second note is incorrect. The stored determination may also include the determination that the first sound corresponds with note "G" and the second sound corresponds with note "F," and the like.

The computing device 120 also includes a feedback engine 350. The feedback engine 350 is configured to provide feedback to the user (e.g., for sound remediation). The feedback can identify the performance of the user with respect to the first sound corresponding with the first note or the second sound corresponding with the second note (e.g., 50% correct, all note "G" correct, performance over time, etc.). The feedback can identify the range of the mistakes that the user made with respect to particular notes (e.g., more frequently misses higher-frequency or higher-pitch notes, more frequently misses notes when providing sounds before 10 AM, incorrectly provides note C instead of note A, etc.).

The feedback engine 350 is also configured to use the feedback to help identify additional notes (e.g., in a subsequent or second plurality of notes). For example, the feedback engine 350 identifies that the user provides an incorrect sound corresponding to note "G" fifty percent of the time and provides an incorrect sound corresponding to note "F" twenty-five percent of the time. The feedback engine 350 stores this information in the user data store 260 (e.g., user John has trouble with note G more often than note F) so that the analysis engine 310 can access the information and use it to identify a plurality of notes for the user. The feedback can also be used with algorithmic composition to identify a plurality of notes for the user (e.g., the first note is frequently incorrect and the second note is randomized).

The feedback engine 350 is also configured to provide recognition for a user. For example, the feedback can identify that the user improved by 50% over three weeks. The recognition can be shared via a network 140 (e.g., through a social network) or listed on a summary of top-performing users (e.g., for a particular time frame, for a particular user instrument, etc.).

The feedback engine 350 is also configured to provide games for the user. For example, the computing device 120 displays a plurality of notes for the user and receives a plurality of sounds. When the sound corresponding with the note is correct, the feedback engine 350 can display a visual representation of a favorable performance for the user (e.g., a racing horse moving toward a goal, a racecar moving toward a finish line, etc.). In another example, the feedback engine 350 provides flashcards such that the visual representation of a note is on one side of the digital card (e.g., displayed by the GUI), a sound corresponding with the note is caused by the user, and the feedback is provided to the user in response (e.g., by turning the card over to display whether the sound was correct or incorrect, playing the appropriate sound when the user instead causes the incorrect sound, etc.).

The feedback engine 350 is also configured to associate scoring or points with the correct/incorrect sounds. For example, a correct sound is worth five-points and an incorrect sound is worth zero points or negative points. Some notes may be worth more points than other notes (e.g., if the user provided an incorrect sound for the note in response to the first plurality of notes). In another example, the user can cause a correct sound for an enhanced note (e.g., worth double points) and cause subsequent notes to be enhanced as well. The user's score can be used for additional recognition or compared with other users (e.g., in a social network).

The computing device 120 also interacts with one or more data stores, including a user data store 260 and sound history data store 360. The data stores are associated with a distributed or local data system accessible by the server 110. For example, the engines or modules provided by the server 110 (e.g., notes engine 210, remediation engine 220, or algorithmic composition engine 230) provide requests for information that may be stored in one or more of the data stores.

The sound history data store 360 receives one or more sounds from the user. For example, the sound history data store 360 stores a plurality of sounds and/or notes associated with the user. The sound history data store 360 can store a backup of the plurality of notes provided to the user, the corresponding sounds provided by the user, and any remediation or feedback. In some examples, the data from the sound history data store 360 is accessed by the user engine 320 and/or the feedback engine 350 to provide aggregated feedback (e.g., performance of a user over time, performance associated with one note, difficulty of notes over time, etc.).

Figure 4:
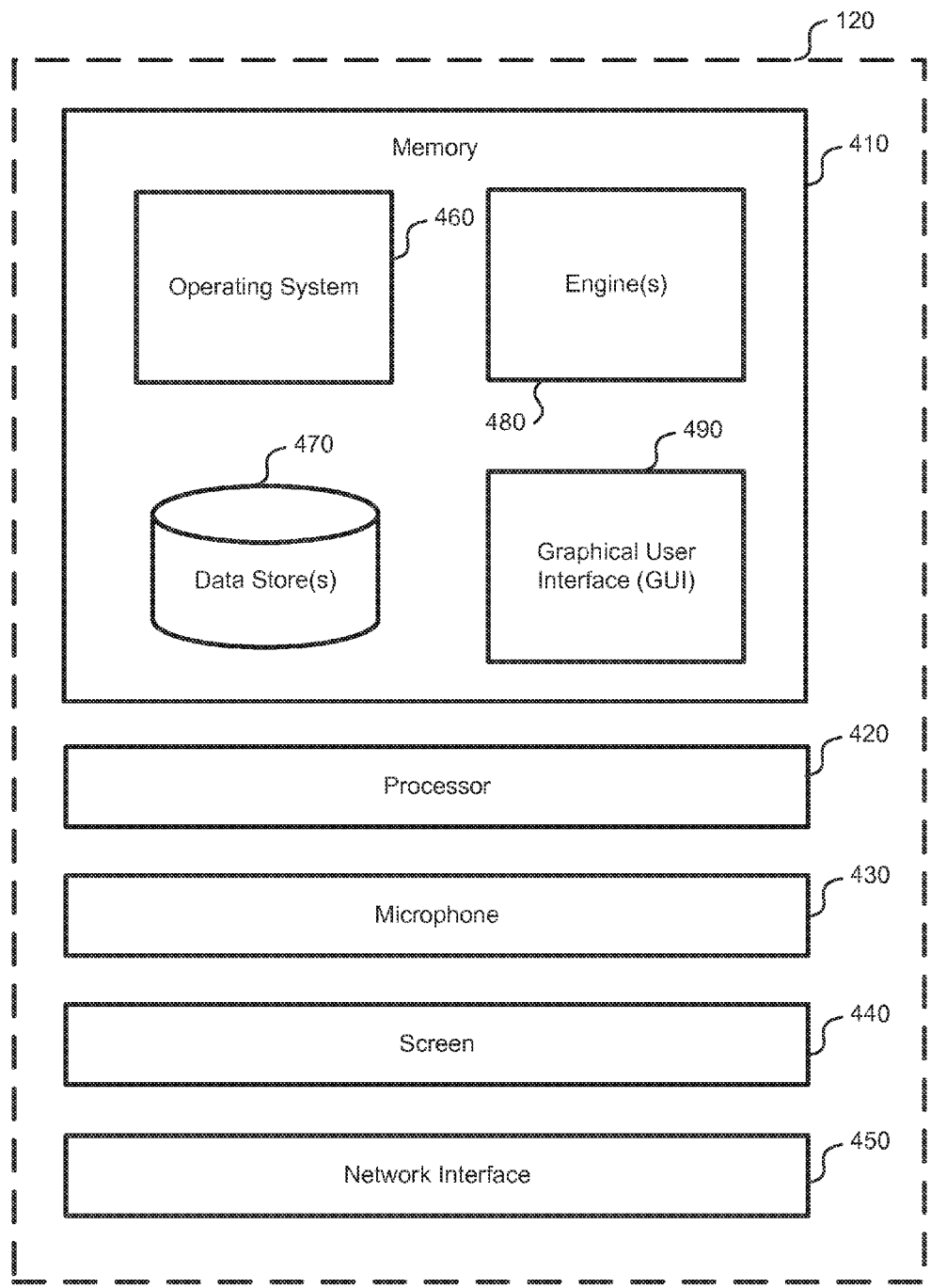
FIG. 4 illustrates an example architecture of a computing device, according to at least one example.

With reference now to FIG. 4, a block diagram of one embodiment of a computing device for providing sound assessment and remediation for a user is shown. For example, the computing device 120 includes a memory 410, processor 420, microphone 430, screen 440, and network interface 450. The memory 410 can comprise an operating system 460, data store(s) 470, engine(s) 480, and graphical user interface (GUI) 490.

The computing device 120 includes memory 410. The memory 410 is configured to store analysis or determinations that notes are correct or incorrect. For example, the memory may store the determination that the first sound that corresponds with the first note is correct and the second sound that corresponds with the second note is incorrect. The memory 410 may also be coupled with a processor 420.

The memory 410 may also store instructions that when executed by a processor, cause the processor to perform operations for providing sound assessment and remediation for a plurality of sounds caused by a user. For example, the operations can comprise identifying a first plurality of notes for the user, displaying the first plurality of notes on a screen of a computing device, receiving the plurality of sounds caused by the user, analyzing the plurality of sounds, identifying a second plurality of notes for the user, and displaying the second plurality of notes.

The computing device 120 also includes a processor 420. The processor 420 is configured to identify a first plurality of notes and second plurality of notes for the user. The first plurality of notes includes a first note and a second note and the second plurality of notes also includes the first note and the second note. The second plurality of notes can identify the repetitiveness (e.g., how often) the first note or second note is displayed, which can be displayed differently for each note.

The processor 420 also identifies a first plurality of notes and/or a second plurality of notes for the user based on algorithmic composition. Algorithmic composition may include selecting one or more notes in a plurality of notes without human intervention, including the use of existing songs generated by humans (e.g., composers) or computers. For example, the processor 420 selects a first note, and then selects a second note based on chance. In another example, the processor 420 selects a first note, and then selects a second note based on a set of customary notes that follow the first note (e.g., from existing songs). The processor 420 can select the second note because the second note less frequently follows the first note. In yet another example, the processor 420 chooses one or more series of pre-defined notes (e.g., set one includes "E, B, F," set two includes "G, B, E," etc.) to the user. In still another example, the processor 420 identifies a plurality of possible notes and/or selects the plurality of notes to display for the user from a plurality of possible notes.

The processor 420 also determines that the first sound corresponds with the first note and that the second sound corresponds with the second note in the first plurality of notes for the user. The processor 420 can parse sound (e.g., a stream of sounds) to identify a plurality of sounds. For example, the stream is parsed once per second so that in a five-second stream of sound, the processor 420 identifies a plurality of sounds that includes five sounds.

The processor 420 also determines that the first sound that corresponds with the first note is correct and that the second sound that corresponds with the second note is incorrect. The processor can determine whether the notes/sounds are correct or incorrect in various ways, including by comparing an appropriate sound with a received sound and determining if the received sound is incorrect based on a threshold difference between the two sounds.

The processor 420 is also configured to identify a remediation score for the user. The remediation score can be associated with the second plurality of notes. The processor 420 can compare the remediation score with a threshold and, when the remediation score is below the threshold, identify a third plurality of notes for the user. The GUI 490 is configured to provide one or more notes from the third plurality of notes to the user.

The computing device 120 also includes a microphone 430. The microphone 430 is configured to receive the plurality of sounds caused by the user. The plurality of sounds includes a first sound and a second sound. The microphone may also receive the first sound corresponding to the first note (e.g., included in the first plurality of notes for the user) and the second sound corresponding to the second note.

The microphone 430 is also configured to identify a type of user instrument that provided the first sound and the second sound based on a timbre. The timbre can be recognized with the first sound or the second sound by the processor 420 or one or more engines 480 associated with the memory 410. For example, the user causes the user instrument to provide a plurality of sounds (e.g., by plucking strings, causing the air column inside the instrument to vibrate, singing, etc.). The user instrument is determined from the plurality of sounds (e.g., voice, musical instrument, etc.) based on the characteristics of the sound.

The computing device 120 also includes a screen 440. The screen 440 is configured to display a GUI. The screen 440 may be an interactive display constructed from glass, plastic, or other materials in order to illustrate the GUI, notes, feedback, or other information for the user.

The computing device 120 also includes a network interface 450. The network interface 450 is configured to allow the devices, networks, and other systems to access the other components of the system 100. The network interface 450 can communicate via telephone, cable, fiber-optic, and other wired communication network. In some embodiments, the network interface 450 communicates via cellular networks, WLAN (wireless local area networking) networks, or any other wireless network. The network interface 450 is also configured to send or receive data (e.g., from the server 110, other user devices, or other entities via a social network).

The computing device 120 also includes an operating system 460. The operating system 460 is configured to provide executable program instructions for the general administration and operation of the computing device 120, and can include a computer-readable storage medium (e.g., a hard disk, random access memory, read only memory, etc.) storing instructions that, when executed by a processor, allow the computing device to perform its intended functions. Suitable implementations for the operating system and general functionality of the computing device are known or commercially available, and are readily implemented by persons having ordinary skill in the art.

The computing device 120 also includes one or more data stores 470. The data store(s) 470 are configured to store and provide data for one or more engines 480. For example, the data stores 470 provide one or more notes identified by the computing device 120 to include in the first or second plurality of notes. The data stores 470 can include a notes data store 250, a user data store 260, and a sound history data store 360, as discussed in relation to FIGS. 2-3.

The computing device 120 also includes one or more engines 480. The engine(s) 480 are configured to implement one or more aspects of sound assessment and remediation for a user. For example, the engine 480 may include an analysis engine 310, user engine 320, sound receiving engine 330, sound recording engine 340, feedback engine 350, or any of the engines associated with the server 110, including a notes engine 210, remediation engine 220, or algorithmic composition engine 230.

The computing device 120 also includes a graphical user interface (GUI) 490. The GUI 490 is configured to be displayed by a screen associated with the computing device. The GUI 490 is also configured to provide one or more notes for the user. For example, the GUI is configured to provide the first note to the user included in the first plurality of notes. The first note is a visual representation of the first note displayed on the screen of the computing device. The GUI is also configured to provide the second note to the user included in the first plurality of notes for the user. The second note is a visual representation of the second note displayed on the screen of the computing device.

The GUI 490 is also configured to display the second plurality of notes for the user. The second plurality of notes can also include the first note and the second note. In some examples, the first note in the second plurality of notes is played less often than the second note in the second plurality of notes based in part on the user providing the correct first sound and the incorrect second sound in association with the first plurality of notes.

The GUI 490 is also configured to display a third note. For example, when algorithmic composition chooses a third note in the second plurality of notes to display on the GUI after the first note or the second note, the GUI can display the third note. The third note may be randomized.

The GUI 490 is also configured to provide feedback to the user. The feedback can identify a performance of the user with respect to the first sound corresponding with the first note or the second sound corresponding with the second note. In some examples, the GUI 490 can display games, recognition, flash cards, or other forms of feedback as well.

Figure 5:
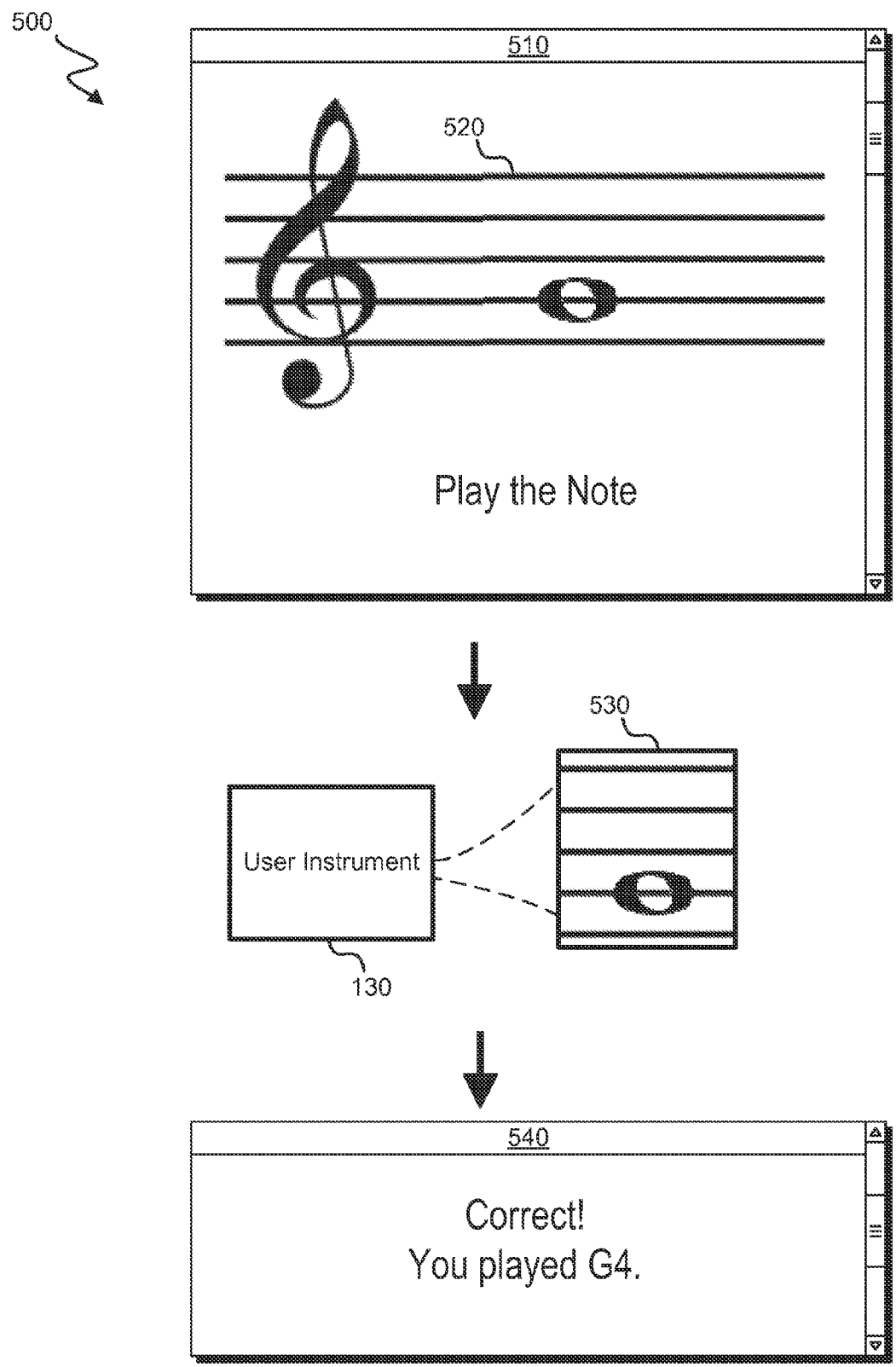
FIG. 5 illustrates an illustration of a graphical user interface for distributing a graphical representation of a note described herein, according to at least one example.

With reference now to FIG. 5, an illustration of a graphical user interface (GUI) for distributing a graphical representation of a note is shown. For example, the illustration 500 includes a GUI 510 (for providing a note to a user) displayed on a screen associated with a computing device, a note 520, a sound 530, and a GUI 540 for displaying feedback. GUI 510 and GUI 540 may be the same GUI or different GUIs.

A computing device 120 can display the note 520 on the GUI 510. The user may recognize the note 520 as a "G4" note. The user causes a sound 530 associated with G4 for the computing device 120 to receive (e.g., via the microphone configured to receive sound). In some examples, the user instrument 130 is played by a user to cause the sound 530. The computing device 120 can analyze the sound to determine that the sound 530 corresponds with the note 520. The computing device 120 also determines whether the sound is correct or incorrect. Feedback can also be provided (e.g., via the GUI 540) that identifies whether the sound corresponding with the note is correct, incorrect, or any other feedback illustrated herein.

Figure 6:
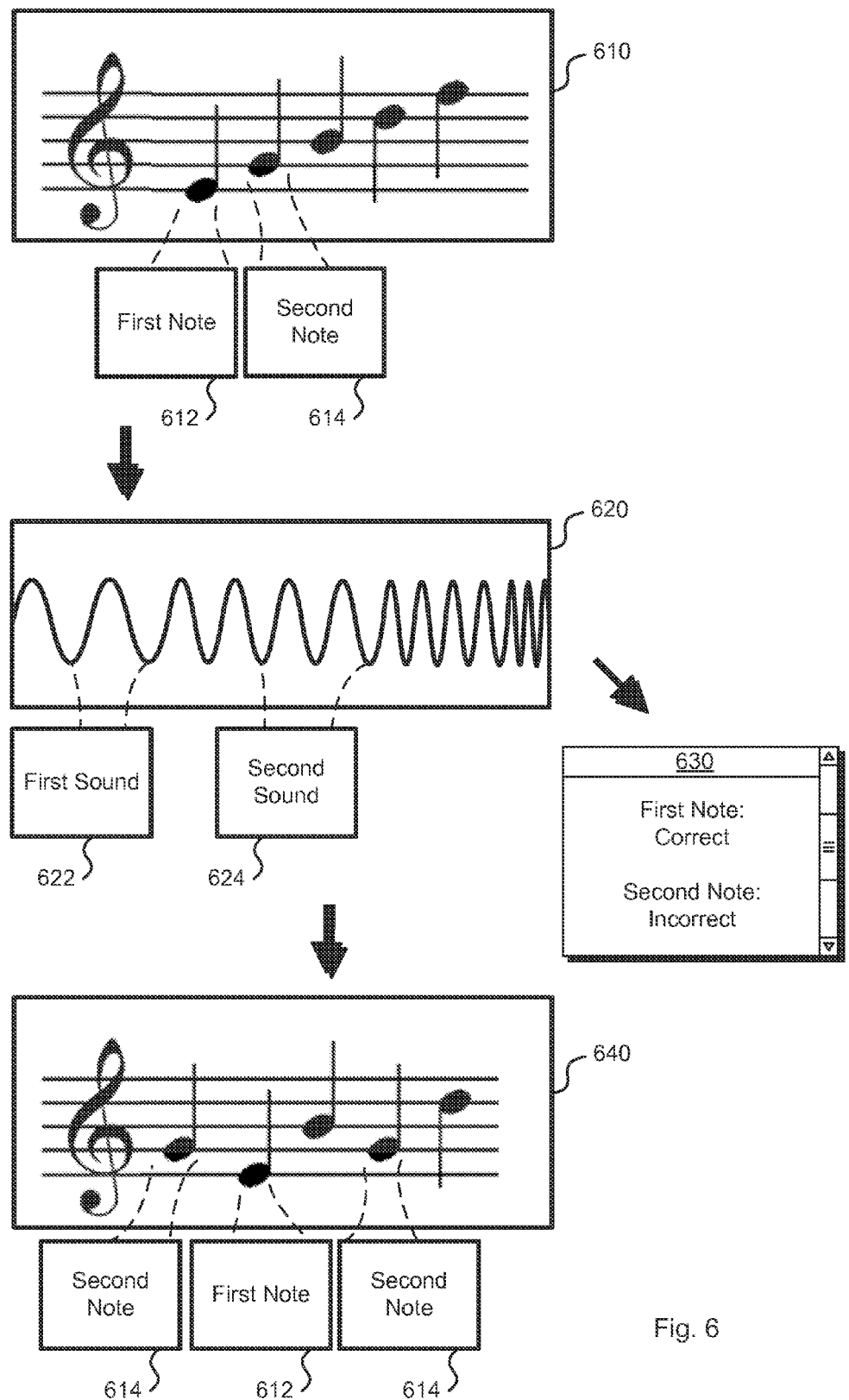
FIG. 6 illustrates an illustrative flow for mapping a plurality of notes to a plurality of sounds, according to at least one example.

With reference now to FIG. 6, an illustrative flow for mapping a plurality of notes to a plurality of sounds is shown. For example, the flow 600 includes a first plurality of notes 610, including a first note 612 and a second note 614, a plurality of sounds 620, including a first sound 622 and a second sound 624, a GUI displaying feedback 630, and a second plurality of notes 640, including the first note 612 and the second note 614.

A first plurality of notes 610 can be provided and/or displayed by a GUI. For example, the first plurality of notes 610 is identified for a user and can include a first note 612 and a second note 614. The first plurality of notes 610 is displayed on the screen of the computing device and includes visual representations of the first note 612 and the second note 614.

In some embodiments, a metronome is provided (e.g., provided and/or displayed by a GUI, provide sounds through speakers at the computing device 120, etc.). The metronome can produce regular, metrical sounds for a measure. When more than one note is displayed at a time, the metronome may be displayed before sounds are caused by the user to help set a pace for the speed at which the user can play.

A computing device may receive a plurality of sounds 620. The plurality of sounds 620 is caused by the user and includes a first sound and a second sound. The plurality of sounds is analyzed. The analysis can include determining that the first sound corresponds with the first note, the first sound that corresponds with the first note is correct, the second sound corresponds with the second note, and the second sound that corresponds with the second note is incorrect.

Feedback 630 can be provided for the user. As illustrated, the feedback 630 includes identifying which notes in the first plurality of notes are correct or incorrect. The feedback 630 can be displayed on the screen of the computing device for the user (e.g., via a GUI).

A second plurality of notes 640 are identified for the user. The second plurality of notes 640 includes the first note and the second note 614, which include visual representations of the first note and the second note displayed on the screen of the computing device. As illustrated, the first note 612 in the second plurality of notes is played less often than the second note 614 in the second plurality of notes 640, based in part on the user providing the correct first sound and the incorrect second sound in association with the first plurality of notes 610.

Figure 7:
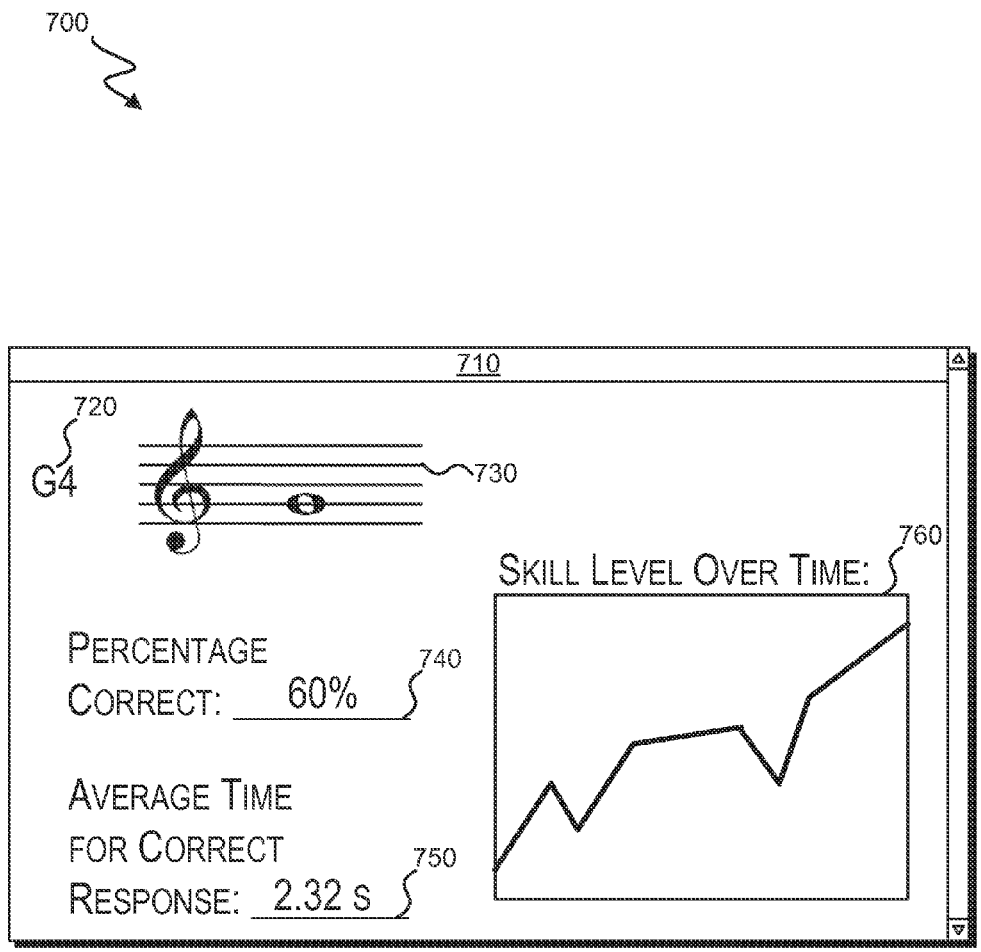
FIG. 7 illustrates feedback related to a sound described herein, according to at least one example.

With reference now to FIG. 7, an illustration of feedback is shown. For example, the feedback 700 can be displayed in a GUI 710 provided through a network page. The GUI 710 includes an alphanumeric name for the note 720, a visual representation of the note 730, percentage correct 740, average time for correct response 750, skill level over time 760, or any other information associated with the feedback or analyzing a user's performance.

The feedback 700 is also configured to provide games for the user (not shown). For example, the computing device 120 displays a plurality of notes for the user and receives a plurality of sounds. When the sound corresponding with the note is correct, the feedback 700 can display a visual representation of a favorable performance for the user (e.g., a racing horse moving toward a goal, a racecar moving toward a finish line, etc.). In another example, the feedback 700 provides flashcards such that the visual representation of a note is on one side of the digital card (e.g., displayed by the GUI), a sound corresponding with the note is caused by the user, and the feedback is provided to the user in response (e.g., turning the card over to display whether the sound was correct or incorrect, playing the appropriate sound when the user causes the incorrect sound, etc.).

The feedback 700 is also configured to associate scoring or points with the correct/incorrect sounds (not shown). For example, a correct sound is worth five-points and an incorrect sound is worth zero points or negative points. Some notes may be worth more points than other notes (e.g., if the user provided an incorrect sound for the note in response to the first plurality of notes). In another example, the user can cause a correct sound for an enhanced note (e.g., worth double points) and cause subsequent notes to be enhanced as well. The user's score can be used for additional recognition or compared with other users (e.g., in a social network).

Figure 8:
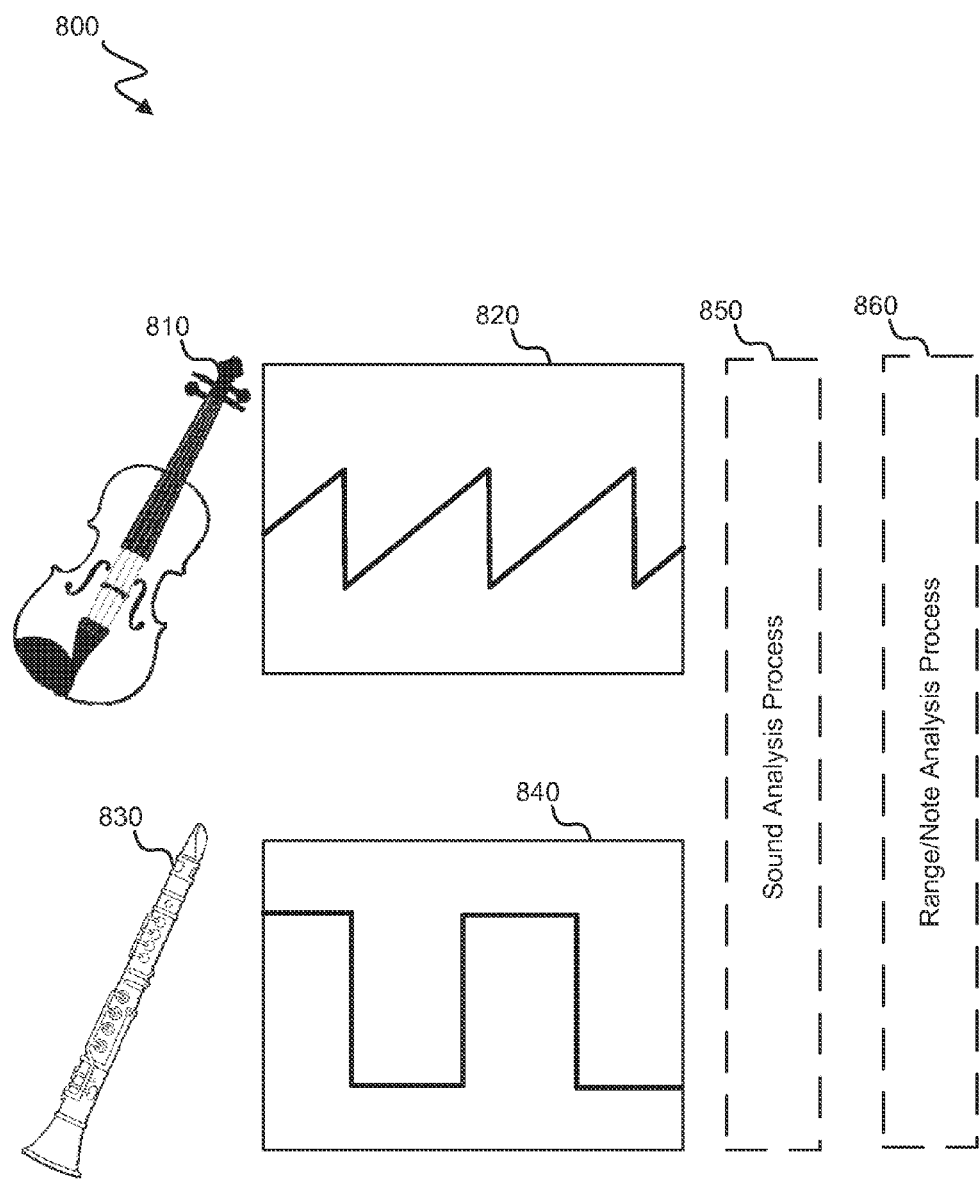
FIG. 8 illustrates an illustrative flow for recognizing an instrument that produces a sound described herein, according to at least one example.

With reference now to FIG. 8, an illustrative flow for recognizing an instrument that produces a sound is shown. For example, the flow 800 includes a first user instrument 810, a first sound 820, a second user instrument 830, a second sound 840, a sound analysis process 850, and a range/notes analysis process 860.

A user may operate the first user instrument 810 to cause the first sound 820 and the second user instrument 830 to cause the second sound 840. The user instruments 810, 830 can include a user's voice, body movements (e.g., clapping), string or electronic instruments (e.g., plucking strings to make sounds), or instruments based on various musical ranges (e.g., soprano, alto, tenor, baritone, or bass). The user instruments 810, 830 may be constructed with various materials, colors, or shapes.

The sounds 820, 840 can vary by instrument. For example, a violin (e.g., user instrument 810) can produce a saw-tooth sound wave (e.g., sound 820) resembling a zigzag pattern because the string on the violin is pulled back and released several times when the user is causing the sound. A clarinet (e.g., user instrument 830) can produce a more hollow sound that resembles a square sound wave (e.g., sound 840).

The sound analysis process 850 can analyze the sound caused by the user instruments 810, 830 to identify a timbre. The sound analysis process 850 can identify a type of user instrument based on a timbre. The timbre can be recognized in the plurality of sounds. For example, the user causes the user instrument to provide a plurality of sounds (e.g., by plucking strings, causing the air column inside the instrument to vibrate, singing, etc.) and the sound analysis process 850 determines the type of user instrument based on the characteristics of the sound.

Once the user instrument is identified, the range/notes analysis process 860 can determine the appropriate range or notes to provide to the user for the particular user instrument. For example, when the instrument is not physically able to generate a sound corresponding with an "E" note, the "E" note will not be displayed. In another example, the identification of the user instrument (e.g., by timbre, by a user's identification of the instrument) as a violin would limit the notes to a smaller and higher range of notes than a piano, and an identification of a double bass would limit the notes to a smaller and lower range of notes than a piano.

Figure 9:
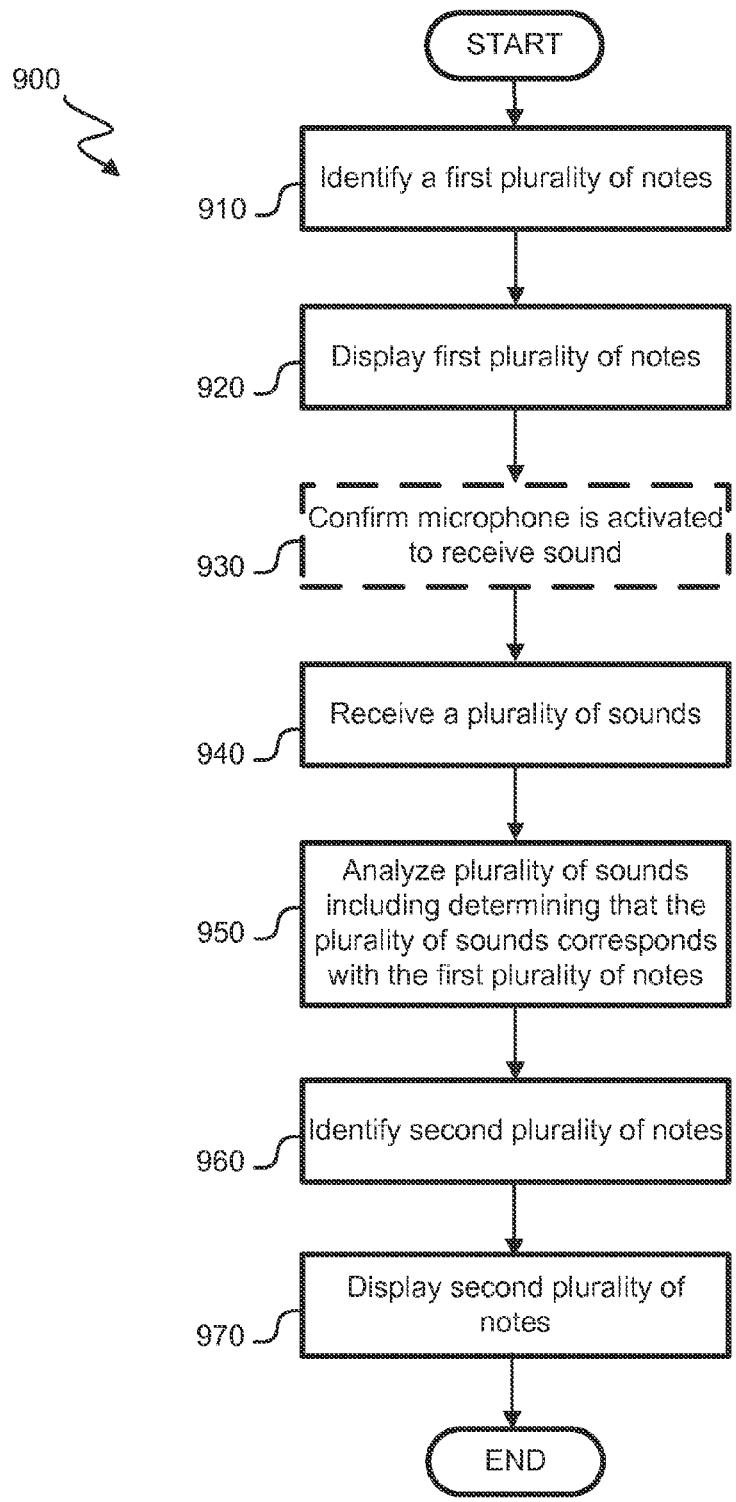
FIG. 9 illustrates an illustrative flow for providing an assessment and remediation of sounds described herein, according to at least one example.

With reference now to FIG. 9, a flowchart illustrating one embodiment of providing sound assessment and remediation for a plurality of sounds caused by a user is shown. The process 900 is performed by one or several of the components of the system 100. The process 900 begins at block 910 when a first plurality of notes is identified. The first plurality of notes includes a first note and a second note. The plurality of notes can include one or more types of notes (e.g., E, F, G, A, B, C, D, whole notes, half notes, quarter notes, etc.) and are identified based on several factors, including confirming each note is played twice in the plurality of notes, confirming the user provides a sound corresponding with each note at least once, etc.

At block 920, a first plurality of notes is displayed. The first plurality of notes are displayed via a GUI, and can include the note with a clef (e.g., defining a pitch range) and/or rests (e.g., breath marks, Caesura, etc.). The clef, notes, and rests can be placed on a staff (e.g., the lines that the plurality of notes are placed on in order to identify the type of note and/or pitch of a diatonic scale). Other information may be provided as well (e.g., accidentals that modify the pitch of the notes, time signatures that define the meter of the music, etc.).

At block 930, a microphone is optionally identified and/or confirmed that the microphone is activated to receive sound. For example, the computing device 120 identifies that the sensor associated with the microphone is turned on, activates a test process for confirming the microphone is plugged in, determines that a driver or software application is properly installed, etc.

At block 940, a plurality of sounds is received. The plurality of sounds can be caused by a user, including a first and second sound. The computing device 120 can wait a predetermined amount of time to receive a sound caused by a user (e.g., three-tenths of one second or any other amount of time) in order to receive and recognize a distinct sound from the user. The computing device may also parse a stream of sounds to identify a plurality of sounds.

At block 950, a plurality of sounds is analyzed. The analysis can include determining that the plurality of sounds corresponds with the first plurality of notes. For example, the analysis identifies that note G4 is associated with a frequency of 391.995 Hz and note F4 is associated with frequency 349.228 Hz. In another example, the analysis engine 310 identifies the sound wave associated with the sound and compares the sound wave with other known sounds waves to determine which sound wave was received from the user.

The analysis can also to determine if a sound is correct or incorrect when compared with a note. For example, once the analysis identifies the received sound (e.g., using the measured frequency of the sound), the analysis determines if the sound is correct or incorrect for the note displayed by the GUI. This may include comparing the note corresponding with the received sound (e.g., note G4) with the note displayed by a GUI (e.g., note F4). When the two sources of notes do not match, the analysis can determine that the user caused an incorrect sound for the particular note. When the two sources match (or match within a threshold), the analysis can determine that the user caused a correct sound for the particular note.

At block 960, a second plurality of notes is identified. The second plurality of notes are identified based on one or more factors, including the performance of the user with respect to particular notes, correct or incorrect sounds caused by the user in response to a previously-displayed plurality of notes, or feedback provided to the user. The second plurality of notes may also be identified using algorithmic composition, as illustrated in FIG. 10.

In some examples, the second plurality of notes are identified based on a percentage of notes that were correct and a percentage of notes that were incorrect from a previous plurality of notes (e.g., 70% of the notes that were incorrect and 30% of the notes that were correct from the first plurality of notes). The identification of correct notes in the second plurality of notes can help the user practice the notes, confirm that the user purposefully provided the appropriate sound corresponding with the note in the first plurality of notes, provide a more complete picture of the notes available for practice, or other reasons.

At block 970, the second plurality of notes is displayed. The process of displaying the second plurality of notes may be similar to block 920.

Figure 10:
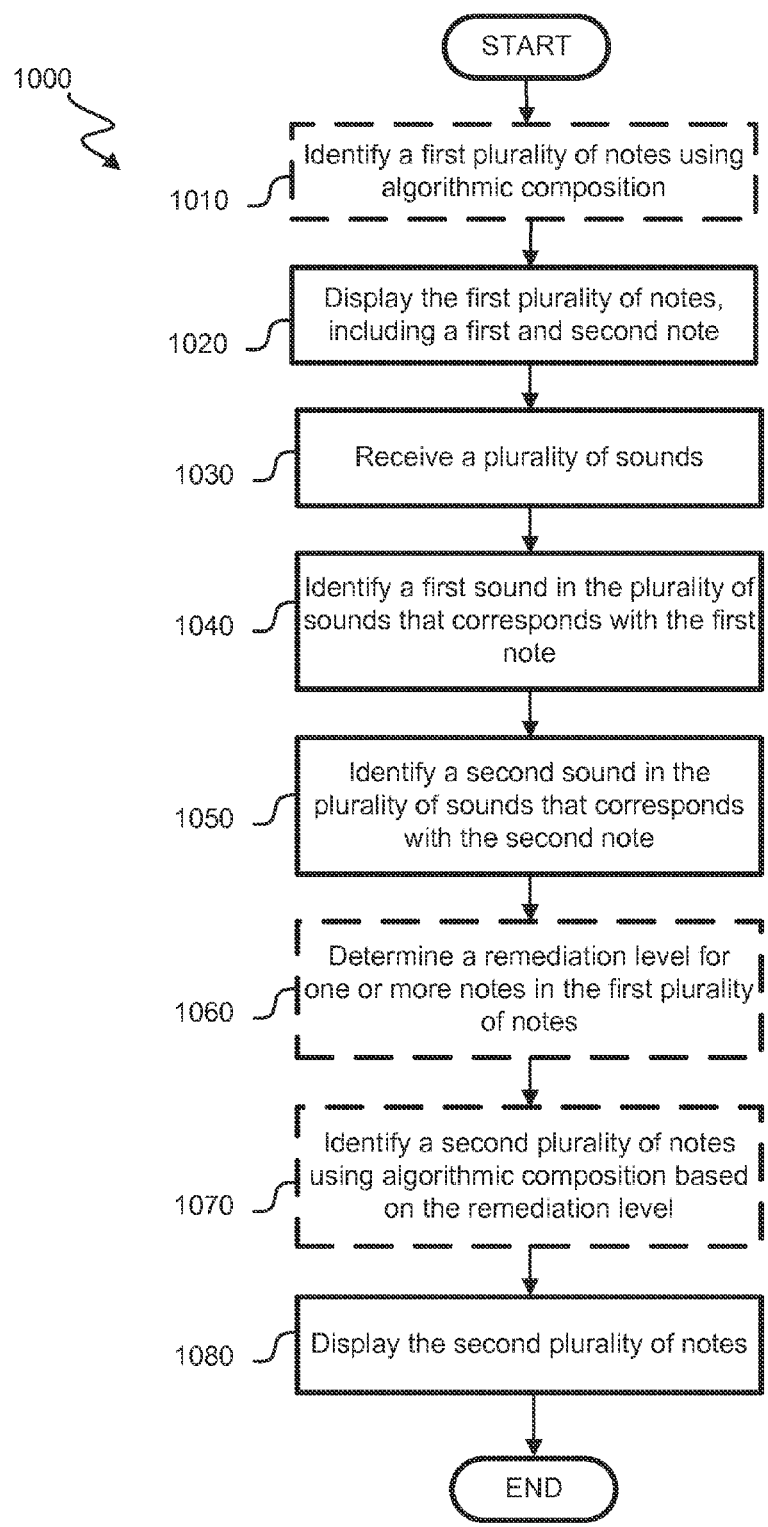
FIG. 10 illustrates an illustrative flow for providing an assessment and remediation of sounds described herein, according to at least one example.

With reference now to FIG. 10, a flowchart illustrating one embodiment of providing sound assessment and remediation for a plurality of sounds caused by a user is shown. The process 1000 is performed by one or several of the components of the system 100. The process 1000 begins at block 1010 when a first plurality of notes is optionally identified using algorithmic composition. For example, the first plurality of notes are selected randomly, based on a note that customarily does not follow a first note in existing songs, or other methods of selecting notes without human intervention.

At block 1020, the first plurality of notes is displayed, including a first note and second note. The process of displaying the first plurality of notes may be similar to block 920.

At block 1030, a plurality of sounds are received. The process of receiving sounds may be similar to block 940.

At block 1040, a first sound in the plurality of sounds is identified and at block 1050, a second sound in the plurality of sounds is identified. The first sound can correspond with the first note and second sound can correspond with the second note. The process of identifying the plurality of sounds may be similar to block 950.

At block 1060, a remediation level is optionally determined. The remediation level may correspond with one or more notes in the first plurality of notes. For example, the remediation level can identify the number of notes to display for the user in the plurality of notes (e.g., one or three notes at a particular time, five notes flashed for a predetermined amount of time over a series of displays, sequentially, etc.), the range of notes displayed for the user (e.g., displaying the eight notes in an octave), the speed at which the notes are displayed (e.g., all notes at one time, flashing a note or plurality of notes for a few seconds, etc.), or any other changeable metric in displaying a plurality of notes to a user.

The remediation level can determine whether a user advances to a higher difficulty level (e.g., scores between 90-100% are associated with low remediation and advance to a more difficult plurality of notes). For example, a skilled user may need less remediation in order to improve (e.g., the user already knows how to sight-read all of the notes). In another example, a user may receive more remediation in order to improve the speed at which the user is able to recognize the notes, even though the user is able to recognize and play the correct sounds that correspond with the notes.

The remediation level can be based on a range of remediation scores. For example, a high remediation level can exist between 25-50% correct. The user's remediation score can be compared with a threshold. When the remediation score is below the threshold, the computing device 120 can identify a plurality of notes for the user based on the identified threshold. When the remediation score is at or above the threshold in comparison with the range of remediation scores, the user can remain at a particular remediation level.

At block 1070, a second plurality of notes can be identified. The identification of the second plurality of notes can be optionally identified using algorithmic composition based on the remediation level. For example, the notes may be correct or incorrect in response to displaying a first plurality of notes, receiving a plurality of sounds, and analyzing the sounds with the notes to determine whether the sounds are correct or incorrect. The process can identify the notes that should be played more frequently (e.g., by displaying the notes that were incorrect more often).

In some embodiments, the algorithmic composition generates more than single notes. When a plurality of notes is identified, the algorithmic composition may generate music that contains patterns or structures that the user should practice. For example, the user may miss G4 followed by F4, so the second plurality of notes can contain a pattern of notes, including G4 followed by F4 for the user to work on, rather than specific notes.

When algorithmic composition is used, the process may identify the second plurality of notes starting with the incorrect first note and choosing a second note based on an algorithmic composition process (e.g., identified by the server 110, identified by the computing device 120, etc.). For example, the analysis engine 310 can select the second note based on chance (e.g., randomly selecting the second note from all possible notes) or some percentage of randomness (e.g., 70% random to ensure that the incorrect notes are displayed more frequently). In another example, the analysis engine 310 can select the second note based on identifying a set of customary notes that follow the first note (e.g., from existing songs). The analysis engine 310 can select the second note because the second note that less frequently follows the first note in the existing songs. In yet another example, the analysis engine 310 can select the second note from several defined series of notes (e.g., set one includes "E, B, F," set two includes "G, B, E," etc.) to provide to the user.

At block 1080, the second plurality of notes can be displayed. The process of displaying the second plurality of notes may be similar to block 920.

Figure 11:
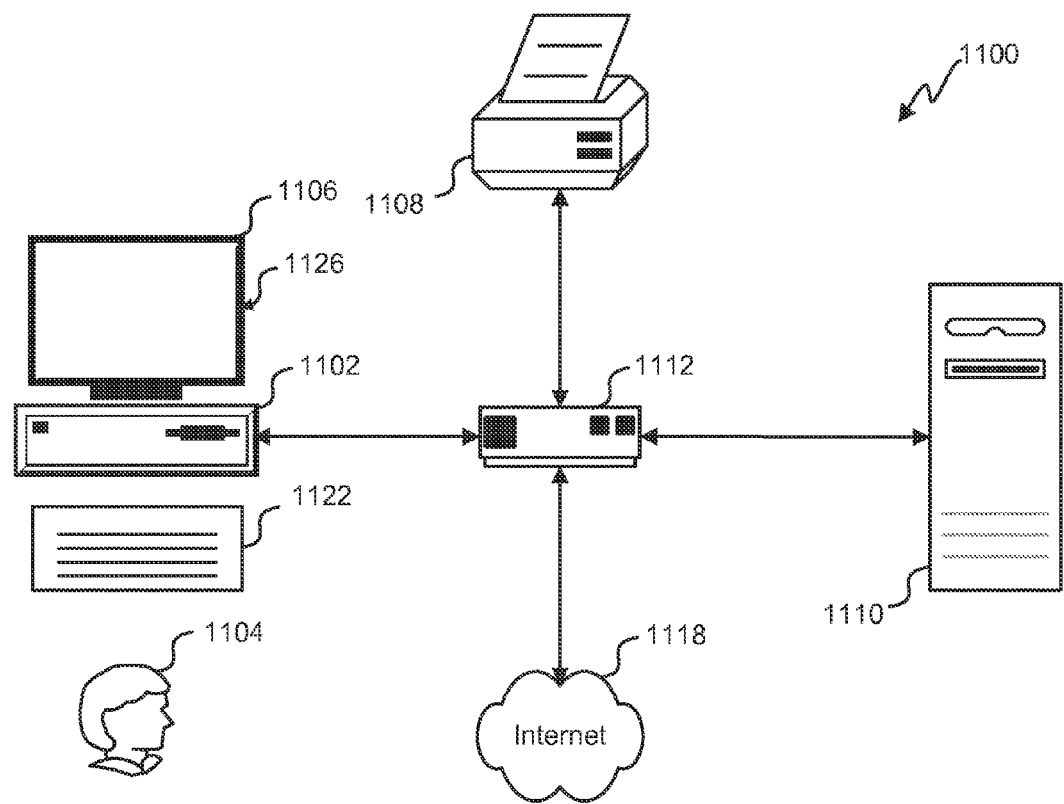
FIG. 11 illustrates an example environment for distributing an educational test question and receiving test answers described herein, according to at least one example.

With reference now to FIG. 11, an exemplary environment with which embodiments may be implemented is shown with a computer system 1100 that can be used by a user 1104 as all or a component of the system 100. The computer system 1100 can include a computer 1102, keyboard 1122, a network router 1112, a printer 1108, and a monitor 1106. The monitor 1106, processor and keyboard 1122 are part of a computer system 1126, which can be a laptop computer, desktop computer, handheld computer, mainframe computer, etc. The monitor 1106 can be a CRT, flat screen, etc.

A user 1104 can input commands into the computer 1102 using various input devices, such as a mouse, keyboard 1122, track ball, touch screen, etc. If the computer system 1100 comprises a mainframe, a user 1104 can access the computer 1102 using, for example, a terminal or terminal interface. Additionally, the computer system 1126 may be connected to a printer 1108 and a server 1110 using a network router 1112, which may connect to the Internet 1118 or a wide-area network (WAN).

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
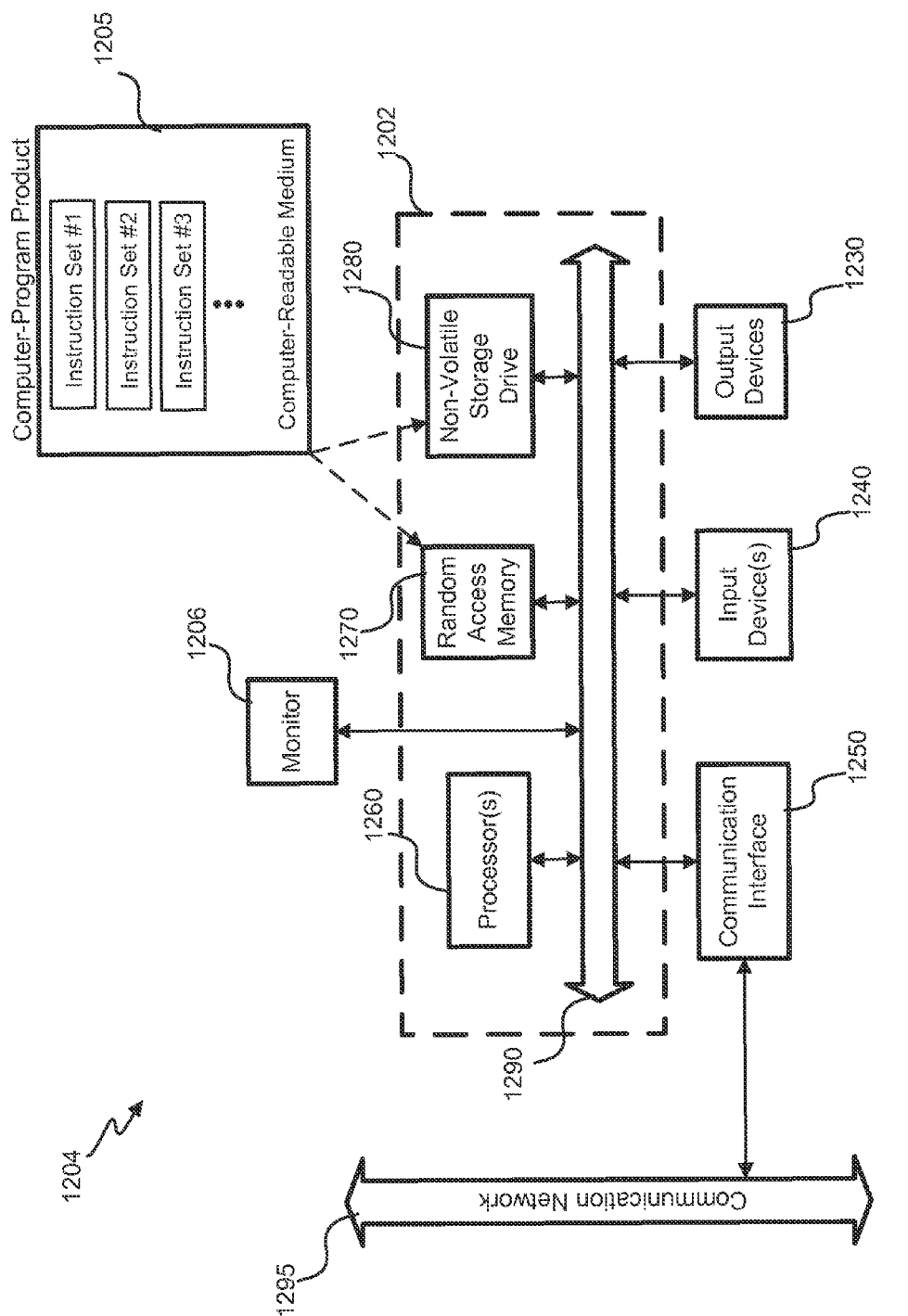
FIG. 12 illustrates an example special-purpose computer system, according to at least one example.

With reference to FIG. 12, an embodiment of a special-purpose computer system 1204 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 1204.

Special-purpose computer system 1204 comprises a computer 1202, a monitor 1206 coupled to computer 1202, one or more additional user output devices 1230 (optional) coupled to computer 1202, one or more user input devices 1240 (e.g., keyboard, mouse, track ball, touch screen) coupled to computer 1202, an optional communications interface 1250 coupled to computer 1202, a computer-program product 1205 stored in a tangible computer-readable memory in computer 1202. Computer-program product 1205 directs the special-purpose computer system 1204 to perform the above-described methods. Computer 1202 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1202 and loaded into RAM 1270 or other memory. Each processor 1260 may comprise a microprocessor, such as a microprocessor from Intel®, Advanced Micro Devices®, or the like. To support computer-program product 1205, the computer 1202 runs an operating system that handles the communications of product 1205 with the above-noted components, as well as the communications between the above-noted components in support of the computer-program product 1205. Exemplary operating systems include Windows® from Microsoft Corporation or the like, Solaris® from Oracle Corporation, Linux®, UNIX®, and the like.

User input devices 1240 include all possible types of devices and mechanisms to input information to computer 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1206 via a command such as a click of a button or the like. User output devices 1230 include all possible types of devices and mechanisms to output information from computer 1202. These may include a display (e.g., monitor 1206), printers, non-visual displays such as audio output devices, etc.

Communications interface 1250 provides an interface to other communication networks 1295 and devices and may serve as an interface to receive data from and transmit data to other systems, WANs and/or the Internet. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1202, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1202 communicate with each other as intended. Although bus subsystem 1290 is shown schematically as a single bus, alternative embodiments of the bus subsystem may utilize multiple busses or communication paths within the computer 1202.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computing device for providing sound assessment and remediation for a plurality of sounds caused by a user, the computing device comprising:
    a processor, wherein the processor is configured to:
        identify a first plurality of notes for the user, the first plurality of notes including a first note and a second note, and
    a graphical user interface displayed by a screen associated with the computing device, wherein:
        the graphical user interface is configured to provide the first note to the user,
        the first note is a visual representation of the first note displayed on the screen of the computing device, and
        the first note is included in the first plurality of notes for the user; and
    a microphone, wherein:
        the microphone is configured to receive the plurality of sounds caused by the user,
        the plurality of sounds includes a first sound and a second sound,
        the microphone receives the first sound corresponding to the first note included in the first plurality of notes for the user,
        the processor determines that the first sound corresponds with the first note,
        the processor determines that the first sound that corresponds with the first note is correct,
        the graphical user interface displays a message for the user indicating that the received first sound is correct;
        the graphical user interface provides the second note to the user,
        the second note is a visual representation of the second note displayed on the screen of the computing device,
        the second note is included in the first plurality of notes for the user,
        the microphone receives the second sound,
        the processor determines that the second sound corresponds with the second note in the first plurality of notes for the user,
        the processor determines that the second sound that corresponds with the second note is incorrect, wherein when the second sound is incorrect:
            the graphical user interface displays a message for the user indicating that the received second sound is incorrect;
            the processor identifies a second plurality of notes for the user, the second plurality of notes including the first note and the second note, wherein the first note in the second plurality of notes appears less often than the second note in the second plurality of notes based in part on the user providing the correct first sound and the incorrect second sound in association with the first plurality of notes; and
            the graphical user interface is configured to display the second plurality of notes for the user.

2. The computing device for providing sound assessment and remediation for the plurality of sounds caused by the user of claim 1, wherein the second plurality of notes is identified based on algorithmic composition.

3. The computing device for providing sound assessment and remediation for the plurality of sounds caused by the user of claim 2, wherein the algorithmic composition chooses a third note in the second plurality of notes to display on the graphical user interface after the first note or the second note, wherein the third note is randomized.

4. The computing device for providing sound assessment and remediation for the plurality of sounds caused by the user of claim 1, wherein the graphical user interface is configured to provide feedback to the user, wherein the feedback identifies a performance of the user with respect to the first sound corresponding with the first note or the second sound corresponding with the second note.

5. The computing device for providing sound assessment and remediation for the plurality of sounds caused by the user of claim 1, wherein the microphone is further configured to identify a type of user instrument that provided the first sound and the second sound based on a timbre recognized with the first sound or the second sound.

6. The computing device for providing sound assessment and remediation for the plurality of sounds caused by the user of claim 1 further comprising:
    a memory coupled with the processor, the memory configured to:
        store the determination that the first sound that corresponds with the first note is correct and the second sound that corresponds with the second note is incorrect.

7. The computing device for providing sound assessment and remediation for the plurality of sounds caused by the user of claim 1, wherein the processor is further configured to:
    identify a remediation score for the user, wherein the remediation score is associated with the second plurality of notes,
    compare the remediation score with a threshold, and
    when the remediation score is below the threshold, identify a third plurality of notes for the user, wherein the graphical user interface is configured to provide one or more notes from the third plurality of notes to the user.

8. The computing device for providing sound assessment and remediation for the plurality of sounds caused by the user of claim 1, wherein the plurality of sounds is caused by a voice of the user.

9. The computing device for providing sound assessment and remediation for the plurality of sounds caused by the user of claim 1, wherein the plurality of sounds is caused by the user operating a user instrument.

10. A computer-readable storage medium storing computer-executable instructions that, when executed by a processor, cause the processor to perform operations for providing sound assessment and remediation for a plurality of sounds caused by a user, the operations comprising:
  identifying a first plurality of notes for the user, the first plurality of notes including a first note and a second note;
  displaying the first plurality of notes on a screen of a computing device, wherein the first plurality of notes are visual representations of the first note and the second note displayed on the screen of the computing device;
  receiving the plurality of sounds caused by the user, the plurality of sounds including a first sound and a second sound;
  analyzing the first sound, wherein the analysis includes determining that:
    the first sound corresponds with the first note; and
    the first sound that corresponds with the first note is correct;
  displaying a message for the user indicating that the first note is correct;
  analyzing the second sound, wherein the analysis includes determining that:
    the second sound corresponds with the second note, and
    the second sound that corresponds with the second note is incorrect;
  displaying a message for the user indicating that the second note is incorrect, wherein when the second note is incorrect:
    identifying a second plurality of notes for the user, the second plurality of notes including the first note and the second note, wherein the first note in the second plurality of notes appears less often than the second note in the second plurality of notes based in part on the user providing the correct first sound and the incorrect second sound in association with the first plurality of notes; and
    displaying the second plurality of notes on the screen of the computing device, wherein the second plurality of notes are visual representations of the first note and the second note displayed on the screen of the computing device.

11. The computer-readable storage medium storing computer-executable instructions that, when executed by the processor, cause the processor to perform operations for providing sound assessment and remediation for the plurality of sounds caused by the user of claim 10, wherein the second plurality of notes is identified based on algorithmic composition.

12. The computer-readable storage medium storing computer-executable instructions that, when executed by the processor, cause the processor to perform operations for providing sound assessment and remediation for the plurality of sounds caused by the user of claim 11, wherein the algorithmic composition chooses a third note in the second plurality of notes to display on the screen of the computing device after the first note or the second note, wherein the third note is randomized.

13. The computer-readable storage medium storing computer-executable instructions that, when executed by the processor, cause the processor to perform operations for providing sound assessment and remediation for the plurality of sounds caused by the user of claim 10, further comprising: providing feedback to the user, wherein the feedback identifies a performance of the user with respect to the first sound corresponding with the first note or the second sound corresponding with the second note.

14. The computer-readable storage medium storing computer-executable instructions that, when executed by the processor, cause the processor to perform operations for providing sound assessment and remediation for the plurality of sounds caused by the user of claim 10, further comprising: identifying a type of user instrument that caused the first sound and the second sound based on a timbre recognized with the first sound or the second sound.

15. A computer-implemented method of providing sound assessment and remediation for a plurality of sounds caused by a user, the method comprising:
  identifying a first plurality of notes for the user, the first plurality of notes including a first note and a second note;
  displaying the first plurality of notes on a screen of a computing device, wherein the first plurality of notes are visual representations of the first note and the second note displayed on the screen of the computing device;
  receiving the plurality of sounds caused by the user, the plurality of sounds including a first sound and a second sound;
  analyzing the first sound, wherein the analysis includes determining that:
    the first sound corresponds with the first note, and
    the first sound that corresponds with the first note is correct;
  displaying a message for the user indicating that the first note is correct;
  analyzing the second sound, wherein the analysis includes determining that:
    the second sound corresponds with the second note, and
    the second sound that corresponds with the second note is incorrect;
  displaying a message for the user indicating that the second note is incorrect, wherein when the second note is incorrect:
    identifying a second plurality of notes for the user, the second plurality of notes including the first note and the second note, wherein the first note in the second plurality of notes appears less often than the second note in the second plurality of notes based in part on the user providing the correct first sound and the incorrect second sound in association with the first plurality of notes; and
    displaying the second plurality of notes on the screen of the computing device, wherein the second plurality of notes are visual representations of the first note and the second note displayed on the screen of the computing device.

16. The computer-implemented method of providing sound assessment and remediation for the plurality of sounds caused by the user of claim 15, wherein the second plurality of notes is identified based on algorithmic composition.

17. The computer-implemented method of providing sound assessment and remediation for the plurality of sounds caused by the user of claim 16, wherein the algorithmic composition chooses a third note in the second plurality of notes to display on the screen of the computing device after the first note or the second note, wherein the third note is randomized.

18. The computer-implemented method of providing sound assessment and remediation for the plurality of sounds caused by the user of claim 15, the method further comprising providing feedback to the user, wherein the feedback identifies a performance of the user with respect to the first sound corresponding with the first note or the second sound corresponding with the second note.

19. The computer-implemented method of providing sound assessment and remediation for the plurality of sounds caused by the user of claim 15, the method further comprising identifying a type of user instrument that provided the first sound and the second sound based on a timbre recognized with the first sound or the second sound.

20. The computer-implemented method of providing sound assessment and remediation for the plurality of sounds caused by the user of claim 15, the method further comprising:
   identifying a remediation score for the user, wherein the remediation score is associated with the second plurality of notes;
   comparing the remediation score with a threshold;
   when the remediation score is below the threshold, identifying a third plurality of notes for the user; and
   displaying one or more notes from the third plurality of notes to the user.

\* \* \* \* \*